(12) United States Patent
Shin et al.

(10) Patent No.: US 10,868,601 B2
(45) Date of Patent: Dec. 15, 2020

(54) METHOD AND DEVICE FOR REPORTING CHANNEL STATE INFORMATION IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Younsun Kim, Gyeonggi-do (KR); Youngwoo Kwak, Gyeonggi-do (KR); Hoondong Noh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 189 days.

(21) Appl. No.: 15/735,821

(22) PCT Filed: Jun. 13, 2016

(86) PCT No.: PCT/KR2016/006267
§ 371 (c)(1),
(2) Date: Dec. 12, 2017

(87) PCT Pub. No.: WO2016/200241
PCT Pub. Date: Dec. 15, 2016

(65) Prior Publication Data
US 2020/0067583 A1 Feb. 27, 2020

Related U.S. Application Data

(60) Provisional application No. 62/174,886, filed on Jun. 12, 2015, provisional application No. 62/185,244, (Continued)

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 7/0486* (2013.01);
(Continued)

(58) Field of Classification Search
CPC .. H04B 7/0626; H04B 7/0468; H04B 7/0643; H04B 7/0647; H04W 72/042; H04L 5/005
See application file for complete search history.

(56) References Cited

U.S. PATENT DOCUMENTS 9,408,086 B2   8/2016   Kim et al.
2011/0200137 A1   8/2011   Han et al.
(Continued)

FOREIGN PATENT DOCUMENTS

CN   104995855   10/2015
CN   107852219   3/2018
(Continued)

OTHER PUBLICATIONS

PCT/ISA/210 Search Report issued on PCT/KR2016/006267 (pp. 4).
(Continued)

*Primary Examiner* — Chi Ho A Lee
(74) *Attorney, Agent, or Firm* — The Farrell Law Firm, P.C.

(57) ABSTRACT

The present disclosure relates to a 5G or pre-5G communication system for supporting a data rate higher than that of a 4G communication system such as an LTE system.
The present invention relates to a CSI reporting method and apparatus, and the method of a base station according to the present invention includes transmitting first reference signal information and second reference signal information, transmitting reference signals based on at least one of the first and second reference signal information, transmitting downlink (Continued)

control information (DCI) including information indicating whether the reference signals are transmitted based on the second reference signal information, and receiving Channel State Information (CSI) generated by measuring the reference signals.

15 Claims, 24 Drawing Sheets

Related U.S. Application Data filed on Jun. 26, 2015, provisional application No. 62/245,538, filed on Oct. 23, 2015.

(51) Int. Cl.
*H04B 7/0456* (2017.01)
*H04L 5/00* (2006.01)
*H04W 72/04* (2009.01)

(52) U.S. Cl.
CPC ......... *H04B 7/0632* (2013.01); *H04B 7/0643* (2013.01); *H04B 7/0647* (2013.01); *H04L 5/005* (2013.01); *H04W 72/042* (2013.01)

(56) References Cited

U.S. PATENT DOCUMENTS

| | | |
|---|---|---|
| 2012/0020272 A1 | 1/2012 | Lee et al. |
| 2012/0155414 A1 | 6/2012 | Noh et al. |
| 2013/0003788 A1* | 1/2013 | Marinier ................ H04B 7/024 375/219 |
| 2013/0194931 A1 | 8/2013 | Lee et al. |
| 2013/0195034 A1 | 8/2013 | Noh et al. |
| 2013/0301548 A1* | 11/2013 | Etemad ................ H04W 4/16 370/329 |
| 2013/0322376 A1* | 12/2013 | Marinier ............. H04B 7/2612 370/329 |
| 2014/0092792 A1 | 4/2014 | Kim et al. |
| 2014/0133395 A1 | 5/2014 | Nam et al. |
| 2014/0192917 A1 | 7/2014 | Nam et al. |
| 2014/0198675 A1 | 7/2014 | He et al. |
| 2014/0233519 A1 | 8/2014 | Nagata et al. |
| 2014/0247759 A1 | 9/2014 | Zhang et al. |
| 2014/0307820 A1 | 10/2014 | Chen et al. |
| 2014/0362793 A1* | 12/2014 | Chai et al. ............ H04W 24/00 370/329 |
| 2015/0016369 A1 | 1/2015 | Park et al. |
| 2015/0043469 A1 | 2/2015 | Kim et al. |
| 2015/0055496 A1* | 2/2015 | Zhao .................... H04W 56/00 370/252 |
| 2015/0078271 A1 | 3/2015 | Kim et al. |
| 2015/0146542 A1 | 5/2015 | Xia et al. |
| 2015/0155992 A1 | 6/2015 | Kim et al. |
| 2015/0156753 A1 | 6/2015 | Shan et al. |
| 2015/0162966 A1 | 6/2015 | Kim et al. |
| 2015/0180625 A1 | 6/2015 | Park et al. |
| 2015/0215906 A1 | 7/2015 | Park et al. |
| 2015/0236828 A1 | 8/2015 | Park et al. |
| 2015/0249511 A1* | 9/2015 | Chen .................... H04L 1/0026 370/252 |
| 2015/0280801 A1 | 10/2015 | Xin et al. |
| 2015/0349867 A1 | 12/2015 | Guo et al. |
| 2016/0029238 A1* | 1/2016 | Chen .................... H04W 24/10 370/252 |
| 2016/0029396 A1 | 1/2016 | Feng et al. |
| 2016/0050007 A1 | 2/2016 | Lee et al. |
| 2016/0100384 A1* | 4/2016 | Etemad ................ H04L 41/0659 370/329 |
| 2016/0227485 A1 | 8/2016 | Davydov et al. |
| 2016/0249337 A1* | 8/2016 | Liang .................. H04W 72/042 |
| 2017/0033912 A1 | 2/2017 | Onggosanusi et al. |
| 2017/0085355 A1* | 3/2017 | Hayashi ................ H04L 5/1469 |
| 2017/0250781 A1* | 8/2017 | Golitschek Edler Von Elbwart ............... H04B 7/0456 |
| 2017/0332368 A1* | 11/2017 | Einhaus ............... H04B 7/0608 |
| 2018/0026684 A1 | 1/2018 | Wei et al. |
| 2018/0123755 A1* | 5/2018 | Kim ..................... H04B 7/0617 |

FOREIGN PATENT DOCUMENTS

| | | |
|---|---|---|
| EP | 2 869 478 | 5/2015 |
| EP | 2 966 931 | 1/2016 |
| EP | 3 125 438 | 2/2017 |
| KR | 1020110095060 | 8/2011 |
| KR | 1020130075311 | 7/2013 |
| KR | 1020130084607 | 7/2013 |
| KR | 1020140121541 | 10/2014 |
| KR | 1020140144205 | 12/2014 |
| KR | 1020150023363 | 3/2015 |
| KR | 1020150079948 | 7/2015 |
| WO | WO 2014/007512 | 1/2014 |
| WO | WO 2014/010911 | 1/2014 |
| WO | WO 2014/113087 | 7/2014 |
| WO | WO 2014/135100 | 9/2014 |
| WO | WO 2014/139303 | 9/2014 |
| WO | WO 2014/166384 | 10/2014 |

OTHER PUBLICATIONS

PCT/ISA/237 Written Opinion issued on PCT/KR2016/006267 (pp. 6).
European Search Report dated Jun. 5, 2018 issued in counterpart application No. 16807881.4-1219, 8 pages.
U.S. Office Action dated May 2, 2019 issued in counterpart U.S. Appl. No. 15/737,735, 11 pages.
U.S. Office Action dated Nov. 27, 2018 issued in counterpart U.S. Appl. No. 15/737,735, 17 pages.
Alcatel-Lucent et al., "Considerations for DMRS Enhancement in 3D MIMO", R1-152663, 3GPP TSG RAN WG1 Meeting #81, May 25-29, 2015, 4 pages.
3rd Generation Partnership Project; Technical Specification Group Radio Access Network; Evolved Universal Terrestrial Radio Access (E-UTRA); Multiplexing and Channel Coding (Release 12), 3GPP TS 36.212 V12.4.0, Mar. 2015, 96 pages.
International Search Report dated Sep. 23, 2016 issued in counterpart application No. PCT/KR2016/006438, 4 pages.
U.S. Office Action dated Nov. 12, 2019 issued in counterpart U.S. Appl. No. 15/737,735, 10 pages.
U.S. Office Action dated Mar. 13, 2020 issued in counterpart U.S. Appl. No. 15/737,735, 9 pages.
Chinese Office Action dated Jun. 12, 2020 issued in counterpart application No. 201680068547.2, 30 pages.
Samsung, "BI and PMI Reporting for Class B", R1-155505, 3GPP TSG RAN WG1 Meeting #82bis, Oct. 5-9, 2015, 5 pages.
Catt, "Beam Selection Indicator on Pucch for CSI Reporting Class B", R1-155215, 3GPP TSG RAN WG1 Meeting #82bis, Oct. 5-9, 2015, 3 pages.
International Search Report dated Feb. 6, 2017 issued in counterpart application No. PCT/KR2016/011904, 35 pages.
European Search Report dated Nov. 23, 2018 issued in counterpart application No. 16857821 issued in counterpart application No. 16857821.9-1219, 14 pages.
U.S. Office Action dated Aug. 6, 2019 issued in counterpart U.S. Appl. No. 15/770,458, 6 pages.
U.S. Office Action dated Dec. 19, 2019 issued in counterpart U.S. Appl. No. 15/770,458, 9 pages.
European Search Report dated Aug. 8, 2018 issued in counterpart application No. 16857821.9-1219, 12 pages.

* cited by examiner

METHOD AND DEVICE FOR REPORTING CHANNEL STATE INFORMATION IN WIRELESS COMMUNICATION SYSTEM

PRIORITY

This application is a National Phase Entry of International Application No. PCT/KR2016/006267 which was filed on Jun. 13, 2016, and claims priority to U.S. Provisional Patent Application Nos. 62/174,886, 62/185,244, and 62/245,538, which were filed on Jun. 12, 2015, Jun. 26, 2015, and Oct. 23, 2015, respectively, the content of each of which is incorporated herein by reference.

TECHNICAL FIELD

The present invention relates to a wireless communication system and, in particular, to a channel state information report method and apparatus of a terminal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Thus there are various attempts to apply the IoT to the 5G communication system. For example, the sensor network, Machine to Machine (M2M), and Machine Type Communication (MTC) technologies are implemented by means of 5G communication technologies such as beamforming, MIMO, and array antenna. The application of the aforementioned cloud RAN as a big data processing technology is an example of convergence between the 5G and IoT technologies.

The mobile communication system has evolved beyond the early voice-oriented services to become a high-speed, high-quality wireless packet data communication system capable of providing data and multimedia services. Standardization organizations such as the $3^{rd}$ Generation Partnership Project (3GPP), the $3^{rd}$ Generation Partnership Project-2 (3GPP2), and the Institute of Electrical and Electronics Engineers (IEEE) have standardized $3^{rd}$ Generation mobile communication systems based on the multicarrier multiple-access scheme. Recently, various multicarrier-based mobile communication standards such as 3GPP Long Term Evolution (LTE), 3GPP2 Ultra Mobile Broadband, and IEEE 802.16e have been developed to meet the requirements of high-speed, high-quality wireless packet data communication services.

The existing 3G wireless packet data communication systems, LTE, UMB, and 802.16x, operate based on multi-carrier multiple access schemes and adopt various techniques such as MIMO, beamforming, Adaptive Modulation and Coding (AMC), and Channel-Sensitive Scheduling to improve transmission efficiency. The above techniques are capable of improving transmission efficiency and system throughput by adjusting data rates through concentrating transmission power to certain antennas according to the channel quality and transmitting data selectively to the user with a high channel quality. Since most of these techniques operate based on the Channel State Information (CSI) between a base station (BS) (hereinafter, interchangeably referred to as evolved Node B (eNB)) and a terminal (hereinafter, interchangeably referred to as a User Equipment (UE) or a Mobile Station (MS)), it is necessary for the base station or the terminal to measure the channel state therebetween using a reference signal such as Channel State Indication Reference Signal (CSI-RS). The eNB denotes a device located at a certain place for downlink transmission and uplink reception, and one eNB may take charge of a plurality of cells. A mobile communication system is comprised of a plurality of eNBs distributed geometrically, and each eNB can accommodate a plurality of cells for communicating signals.

As described above, an eNB or a UE may measure a channel state between the eNB and the UE for use by the eNB in downlink scheduling. At this time, the UE may measure a reference signal (CSI-RS) transmitted by the eNB and feed back the measurement result to the eNB. In the following description, the information on the channel state measured using the reference signal between an eNB and a UE is referred to as Channel State Information (CSI).

Meanwhile, the eNB may trigger aperiodic CSI reporting, if necessary, in order to receive CSI from the UE; however, in the case that aperiodic CSI report is triggered, the UE reports periodically-measured CSI aperiodically, resulting in CSI inaccuracy.

DISCLOSURE OF INVENTION

Technical Problem

The present invention has been conceived to solve the above problem and aims to provide a method and apparatus for a UE to measure a reference signal transmitted by an eNB and transmit channel state information generated based on the measurement result to the eNB.

Also, the present invention aims to provide a method and apparatus for an eNB to configure parameters for use by a UE in generating and reporting channel state information and to receive the channel state information generated based on the reference signal measurement result according to the parameters.

Also, the present invention aims to provide a channel state information feedback method that is capable of improving channel information accuracy based on the beamformed reference signal in an FD-MIMO system.

Solution to Problem

In accordance with an aspect of the present invention, a method of a base station includes transmitting first reference signal information and second reference signal information, transmitting reference signals based on at least one of the first and second reference signal information, transmitting Downlink Control Information (DCI) including information indicating whether the reference signals are transmitted based on the second reference signal information, and receiving Channel State Information (CSI) generated by measuring the reference signals.

In accordance with another aspect of the present invention, a method of a terminal includes receiving first reference signal information and second reference signal information, receiving DCI, receiving reference signals based on at least one of the first and second reference signal information determined based on the DCI, and reporting Channel State Information (CSI).

In accordance with another aspect of the present invention, a base station includes a transceiver and a controller configured to control transceiver to transmit first reference signal information and second reference signal information, transmit reference signals based on at least one of the first and second reference signal information, transmit DCI including information indicating whether the reference signals are transmitted based on the second reference signal information, and receive Channel State Information (CSI) generated by measuring the reference signals.

In accordance with still another aspect of the present invention, a terminal includes a transceiver and a controller configured to control the transceiver to receive first reference signal information and second reference signal information, receive DCI, receive reference signals based on at least one of the first and second reference signal information determined based on the DCI, and report Channel State Information (CSI).

Advantageous Effects of Invention

The CSI feedback method of the present invention is advantageous in terms of improving the accuracy of CSI reported by a UE even when the aperiodic CSI reporting is triggered.

MODE FOR THE INVENTION

Figure 1:
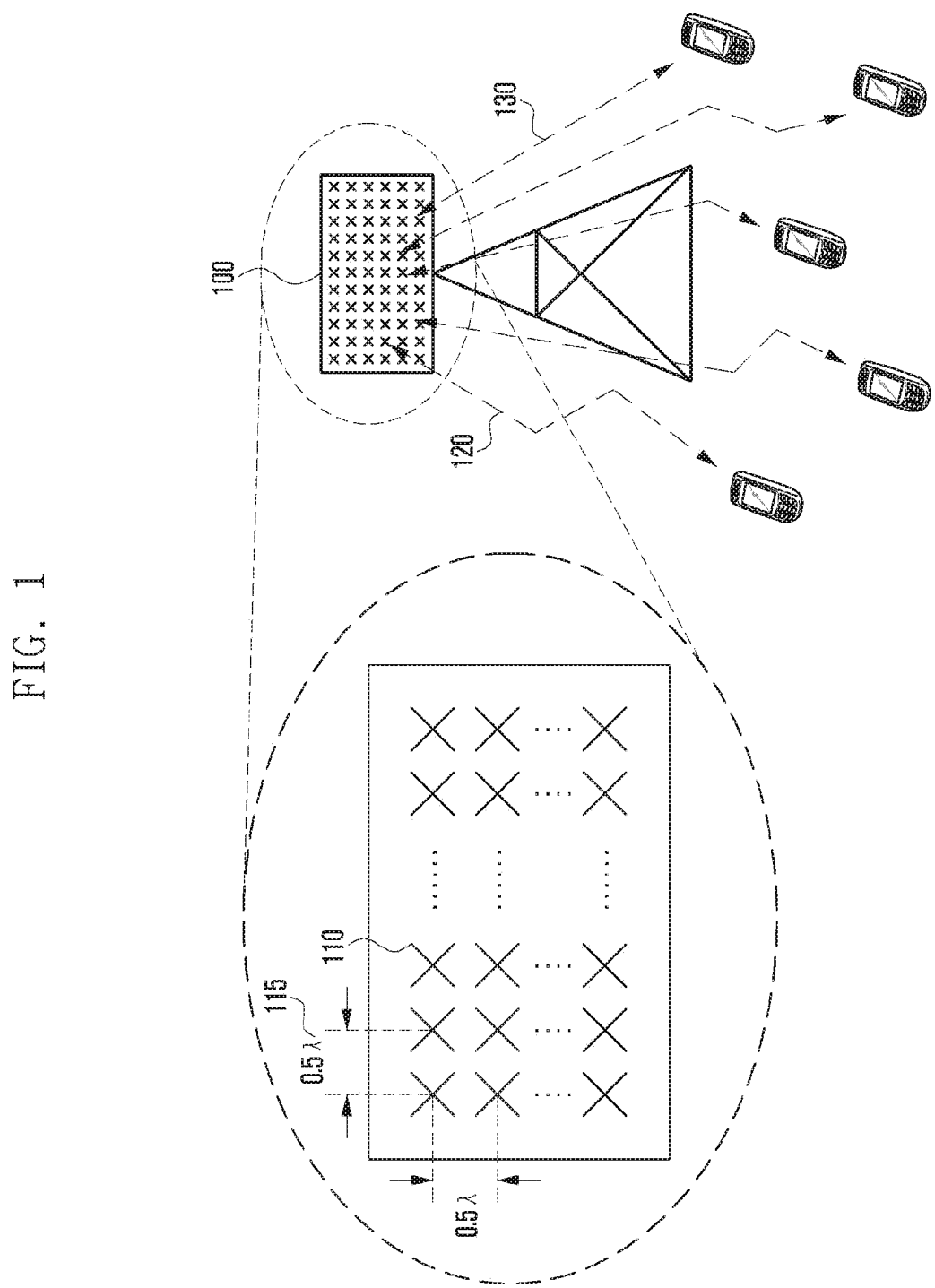
FIG. 1 is a diagram illustrating an FD-MIMO system.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

For the same reason, some of the elements in the drawings are exaggerated, omitted, or simplified; and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed descriptions of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram illustrating an FD-MIMO system.

Existing 3G and 4G mobile communication systems represented by LTE/LTE-A adopt a MIMO technique which uses a plurality transmission/receive antennas to increase the data rate and system throughput.

The MIMO technique makes it possible to transmit spatially-separated multiple information streams. This technique of transmitting multiple spatially-separated information streams is referred to as spatial multiplexing. Typically, the number of information streams to be spatially multiplexed is determined depending on the number of antennas of the transmitter and receiver. The number of information streams that can be spatially multiplexed is referred to as a rank of the corresponding transmission.

The LTE/LTE-A Release 11 supports 8×8 MIMO spatial multiplexing and up to rank 8. Meanwhile, in comparison with the legacy LTE/LTE-A MIMO technology supporting up to 8 antennas, the Full Dimension MIMO (FD-MIMO) system is capable of utilizing 32 or more transmit antennas.

The FD-MIMO system is characterized by the use of a few dozen or more receive antennas to transmit data. In reference to FIG. 1, a base station transmitter (or eNB) 100 is equipped with a few dozen or more transmit antennas for radio signal transmission. The transmit antennas 110 may be arranged so as to maintain a minimum distance among each other. The minimum distance may, by way of example, be half the wavelength of the radio signal. In the case that the transmit antennas are arranged at a distance of half the wavelength of the radio signal, the signals transmitted by the respective transmit antennas are influenced by radio channels with low correlation. Assuming the radio signal is transmitted in the 2 GHz frequency band, the minimum distance is 7.5 cm and becomes shorter as the frequency band becomes higher than 2 GHz.

As shown in FIG. 1, a few dozen or more transmit antennas 110 of the eNB 100 may be used to transmit signals to one or more UEs as denoted by reference numbers 120 and 130. In order to transmit signals to a plurality of UEs simultaneously, the signals are pre-coded appropriately.

A UE may receive one or more information streams. Typically, the number of information streams that a terminal can receive simultaneously may be determined depending on the number of receive antennas of the UE and the channel condition.

In order to realize the advantages of the FD-MIMO system, it is necessary for the UE to measure the channel condition and interferences accurately and transmit the CSI generated based thereon efficiently to the eNB. The eNB may select the UE to transmit signals, a data rate for the transmission, and a suitable precoder to be applied.

In the case of applying the CSI transmission scheme of the legacy LTE/LTE-A system to the FD-MIMO system utilizing a plurality of transmit antennas, however, the increased uplink control information may cause an uplink overhead problem. The mobile communication systems are characterized by constraints on time, frequency, and power. This means that the greater the allocation of resources for reference signals, the smaller the allocation of resources for the data traffic channel, resulting in a reduction of the absolute data transmission amount. In this case, it may be possible to expect the enhancement of channel measurement and channel estimation performance, but the decreased data transmission amount results in a reduction of the total system throughput. There is therefore a need of a method capable of allocating resources for reference signals and data traffic channels appropriately so as to optimize the total system throughput.

Figure 2:
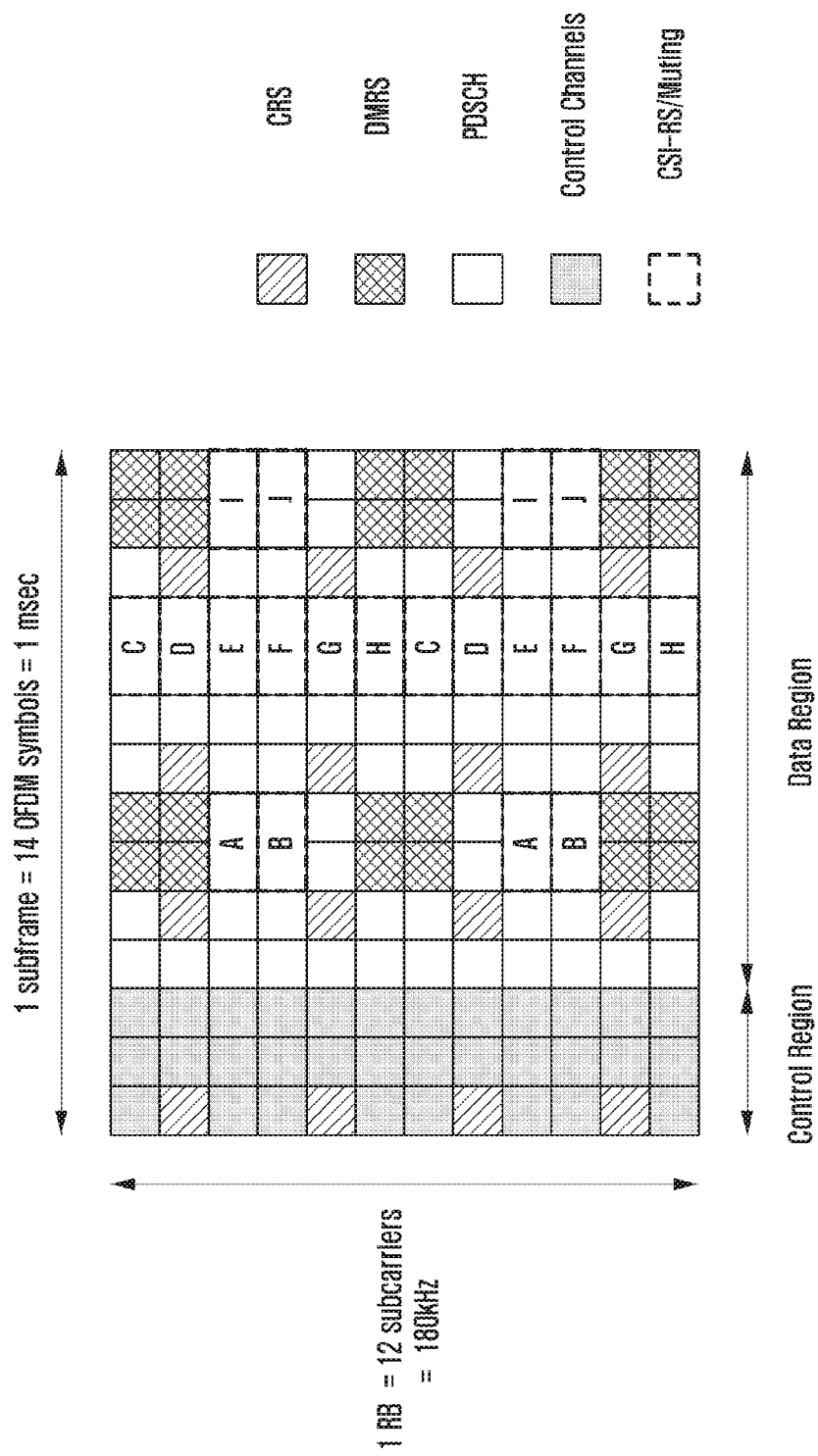
FIG. 2 is a diagram illustrating a structure of a subframe.

FIG. 2 is a diagram illustrating a structure of a subframe.

The radio resource depicted in FIG. 2 is of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as a Resource Element (RE).

The radio resource structured as shown in FIG. 2 may be configured to transmit different types of signals as follows:

1. Cell-specific Reference Signal (CRS): This is a reference signal broadcast periodically for use commonly by all UEs within one cell.

2. Demodulation Reference Signal (DMRS): This is a reference signal transmitted for a specific UE and used only for transmitting data to a corresponding UE. It may be possible to support up to 8 DMRS ports. In LTE/LTE-A, antenna ports 7 to 14 are allocated for DMRS and these ports maintain orthogonality with Code Division Multiplexing (CDM) or Frequency Division Multiplexing (FDM) to avoid interference with each other.

3. Physical Downlink Shared Channel (PDSCH): This is a downlink channel for use in transmitting traffic (or data) from an eNB to a UE. The eNB may transmit data using REs to which no reference signal is mapped in the data region (or PDSCH region) in FIG. 2.

4. CSI-RS: This is a reference signal transmitted for use by UEs within a cell in channel state measurement. There may be multiple CSI-RSs transmitted within a cell.

5. Other control channels (Physical Hybrid-ARQ Indicator Channel (PHICH), Physical Control Format Indicator Channel (PCFICH), and Physical Downlink Control Channel (PDCCH)): An eNB may provide a UE with control information for use in receiving data on PDSCH or transmit HARQ ACK/NACK corresponding to uplink data transmission.

In addition to the above signals, muting may be configured in order for the UEs within the corresponding cell to receive the CSI-RSs transmitted by other eNBs in the LTE-A system. The muting may be configured at the positions designated for CSI-RS and, typically, the UE may omit attempting to receive traffic signals at the muted CSI-RS positions. In the LTE-A system, the muting is referred to as zero power CSI-RS. This is because the muting by nature is mapped to the CSI-RS positions without transmission power. This is because the muting is configured at the CSI-RS positions with zero power. In the following description, CSI-RS configuration information may be interchangeably referred to as NZP CSI-RS configuration information, and the muted CSI-RS configuration information may be interchangeably referred to as ZP CSI-RS configuration information.

In FIG. 2, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J.

The CSI-RS can be mapped to 2, 4, or 8 REs according to the number of the antenna ports for transmission. For two antenna ports, half of a specific pattern is used for CSI-RS transmission; for four antenna ports, the whole of the specific pattern is used for CSI-RS transmission; and for eight antenna ports, two patterns are used for CSI-RS transmission.

Meanwhile, the zero power CSI-RS (muting) is always transmitted in a unit of one pattern. That is, although the muting is applied to plural patterns, if the muting positions do not match CSI-RS positions, the muting cannot be applied to one pattern partially. However, if the CSI-RS positions are identical with the zero power CSI-RS (muting) positions, the muting can be applied to part of a pattern.

In the case of transmitting two antenna port CSI-RSs, the eNB may transmit respective antenna port signals at two REs consecutively on the time axis, the antenna ports signals being separated by orthogonal codes. In the case of transmitting four antenna port CSI-RSs, the eNB may further designate two REs consecutive on the time axis to transmit the antenna ports signals. In the case of transmitting eight antenna ports CSI-RSs, the eNB may designate further REs in the same manner.

In a cellular system, the reference signal has to be transmitted for downlink channel state measurement. In the case of the 3GPP LTE-A system, the UE measures the channel condition based on the CSI-RS transmitted by the eNB. The channel condition is measured in consideration of several factors including downlink interference. The downlink interference includes interference caused by the antennas of neighbor eNBs and thermal noise, which are important in determining the downlink channel condition. For example, in the case that the eNB with one transmit antenna transmits the reference signal to the UE with one receive antenna, the UE has to determine energy per symbol that can be received in downlink and the interference amount that may be received for the duration of receiving the corresponding symbol to calculate Es/Io from the received reference signal. The calculated Es/Io is reported to the eNB such that the eNB determines the downlink data rate for the UE. The Es/Io is reported to the eNB for use in determining the downlink data rate for the UE.

In the LTE-A system, the UE transmits downlink channel state information to the eNB for use by the eNB in downlink scheduling. That is, the UE measure the reference signals transmitted by the eNB and feeds back the measurement result in a format specified in the LTE/LTE-A standard. In LTE/LTE-A, the information fed back by the UE as described above is referred to as CSI, which includes three types of information as follows:

Rank Indicator (RI): Indicator indicating the number of spatial layers that can be supported by the UE under current channel conditions.

Precoding Matrix Indicator (PMI): Indicator indicating the precoding matrix suitable for the UE under current channel conditions.

Channel Quality Indicator (CQI): Indicator indicating the maximum data rate available for receiving data at the UE under current channel conditions.

The CQI may be substituted by SINR, maximum error correction code rate and modulation scheme, or data efficiency per frequency that can be used similarly instead of the maximum data rate.

The RI, PMI, and CQI are associated with each other in meaning. For example, the precoding matrix supported in LTE/LTE-A is configured differently per rank. Accordingly, the PMI value is interpreted differently depending on whether the RI is set to 1 or 2. In addition, when determining CQI, the UE assumes that the PMI and RI that the UE has reported are applied by the eNB. For example, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates the CQI with which the optimal performance is achieved in real transmission under the assumption of the transmission mode to be selected by the eNB.

In LTE/LTE-A, the UE may feedback the CSI including RI, PMI, and CQI periodically or aperiodically. If it is intended to acquire the CSI of a specific UE, the eNB may configure aperiodic feedback (or aperiodic CSI report) to the UE using an aperiodic feedback indicator (or CSI request field or CSI request information) included in Downlink Control Information (DCI). It may also be possible to configure the aperiodic feedback such that when the aperiodic feedback indicator is received at the $n^{th}$ subframe the UE transmits the aperiodic feedback information (or CSI) at the $(n+k)^{th}$ subframe during the uplink data transmission. Here, k denotes a parameter specified in the 3GPP LTE standard Release 11, k being set to 4 for the Frequency Division Duplexing (FDD) mode and any value of Table 1 for Time Division Duplexing (TDD) mode.

beamformed signals and feeds back the measurement result to maximize FD-MIMO gain. However, unlike the legacy non-beamformed CSI-RS transmission, the beamformed CSI-RS transmission may cause some issues as follows:

Channel measurement
CSI-RS overhead

First, the channel measurement issue arises because a beam is applied differently on the time and frequency resources. In the current standard, the UE may acquire the CSI through time averaging in the time domain during channel measurement. In this case, the UE performs channel measurement using the CSI-RS received periodically and averages the measurement result to determine the channel state. In the case of using the beamformed CSI-RS, the beam may change as time progresses; thus, time averaging is performed on the pervious beam during channel measurement, resulting in channel measurement inaccuracy. That is, if channel measurement is performed without restriction to the time averaging on the beamformed CSI-RS, this may cause inaccuracy of the measured channel state.

Second, the CSI-RS overhead issue arises because beamforming is performed in a UE-specific manner. Since the eNB has to form UE-specific beams for all UEs, the resource amount for transmitting CSI-RSs increases in proportion to the number of UEs.

In order to solve this problem, it may be possible for the UE to perform aperiodic CSI reporting with restricted CSI-RS resources. With aperiodic CSI-RS reporting, all UEs may share the CSI-RS resources. A description is made hereinafter of the aperiodic CSI reporting method.

Figure 3:
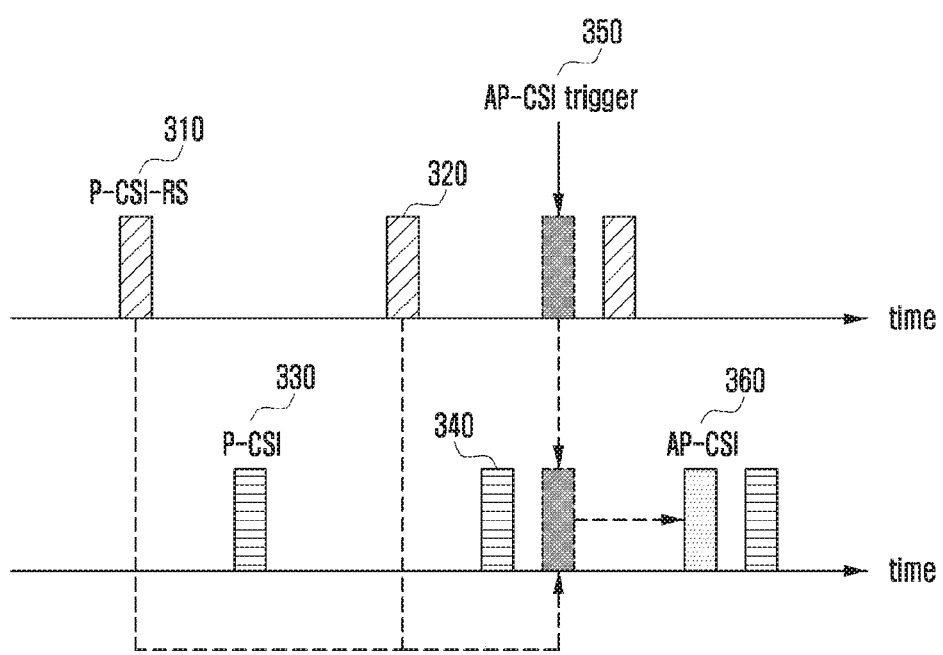
FIG. 3 is a diagram illustrating a CSI-RS-based CSI reporting mechanism of a UE.

FIG. 3 is a diagram illustrating a CSI-RS-based CSI reporting mechanism of a UE.

In reference to FIG. 3, a UE may perform channel measurement periodically with CSI-RS 310 and 320 received periodically from an eNB (hereinafter, referred to

TABLE 1 k per subframe number n in TDD UL/DL configuration

| TDD·UL/DL | subframe number n | | | | | | | | |
|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In the case that the aperiodic feedback is configured, the feedback information (or CSI) may include the RI, PMI, and CQI and, among them, the RI and PMI may not be fed back depending on the feedback configuration (or channel state report configuration). The CQI may include both the wCQI and sCQI or may include only the wCQI.

In the case that the aperiodic feedback is configured, however, the UE aperiodically reports CSI generated based on the periodically-measured CSI, resulting in CSI inaccuracy.

Recently, studies are being conducted on optimized beamforming of CSI-RS for the UE in the FD-MIMO system. Since the FD-MIMO system supports vertical and horizontal beamforming according to the location of the UE, it may be possible to perform beamforming with CSI-RS resources. In this case, the UE performs channel measurement with the as P-CSI-RS) and report the periodically measured CSI 330 and 340 (hereinafter, referred to as P-CSI) to the eNB.

At this time, if an aperiodic CSI reporting trigger 350 (hereinafter, AP-CSI trigger) is transmitted, the UE may generate AP-CSI 360 (hereinafter, referred to as AP-CSI) based on the periodically measured CSI (P-CSI) and reports the AP-CSI to the eNB.

If the CSI-RS is beamformed, the AP-CSI generated based on the P-CSI generated based on the periodically measured CSI is likely to be inaccurate. In this case, consideration may be given to using a time restriction for beamformed CSI-RS-based channel measurement.

Figure 4:
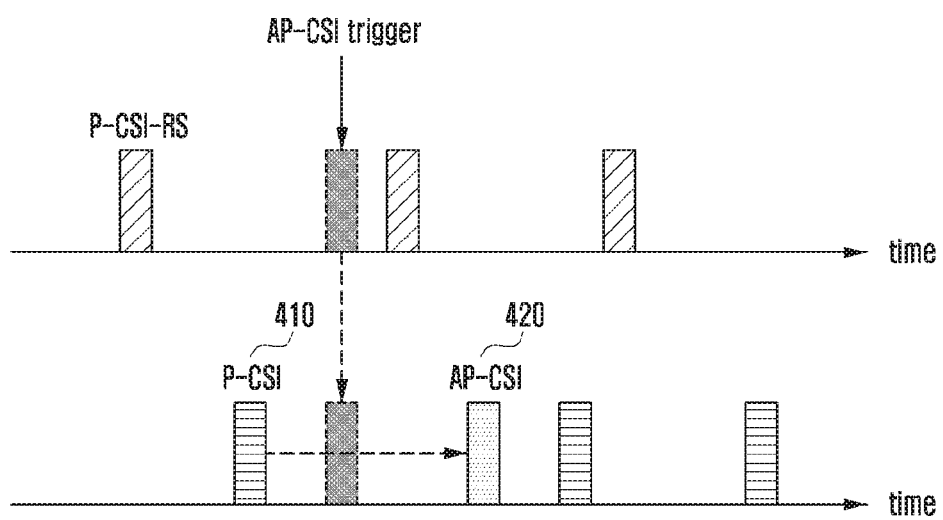
FIG. 4 is a diagram illustrating an aperiodic CSI reporting mechanism.

FIG. 4 is a diagram illustrating an aperiodic CSI reporting mechanism.

FIG. 4 is directed to an exemplary case of calculating AP-CSI with the time restriction and reporting the AP-CSI when AP-CSI reporting is triggered.

The eNB may transmit to the UE an AP-CSI reporting indicator to trigger AP-CSI reporting. The eNB may also transmit time restriction information to the UE. For example, if the beam applied to the CSI-RS is changing, the eNB may know the beam change time so as to trigger CSI-reporting based on the beam change time. In this way, the eNB may apply a time restriction to channel measurement. The eNB may also transmit the time restriction information to the UE based on the beam change time.

Accordingly, the UE may determine the AP-CSI by averaging at least one P-CSI transmitted in a window indicated by the time restriction information among the P-CSIs measured based on the P-CSI-RS.

The drawing is directed to a case where only one P-CSI 410 is in the window indicated by the time restriction information. Accordingly, the UE may report the P-CSI 410 as the AP-CSI 420 to the eNB.

As aforementioned, the FD-MIMO system supports vertical and horizontal beamforming according to the location of the UE as described above; thus, if beamforming is applied to the CSI-RS resources, the UE may perform channel measurement based on the beamformed signal and report the measurement result so as to maximize the FD-MIMO gain. However, the beamforming may vary according to the time-frequency resources; thus, if there is no restriction in time averaging for CSI-RS-based channel measurement, it may be difficult to expect the acquisition of accurate CSI. In the current LTE standard, no restriction is specified in association with the time averaging for P-CSI-RS-based channel measurement of the UE. Also, if the CSI-RS beamforming is performed in a UE-specific manner, this may cause CSI-RS overhead.

In order to solve this problem, the present invention proposes a method for generating and reporting AP-CSI. However, the present invention is not limited to the case of transmitting beamformed CSI-RSs. The aforementioned problem may occur in the case of reporting AP-CSI generated based on the AP-CSI-RS, and the present invention may be applied to the AP-CSI reporting based on the AP-CSI-RS.

Figure 5:
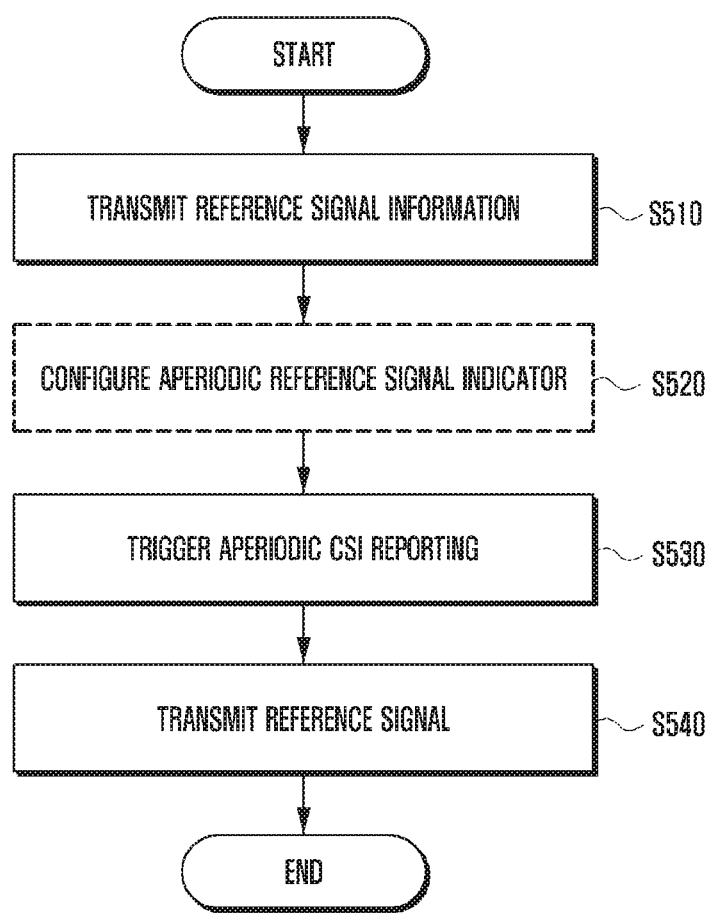
FIG. 5 is a flowchart illustrating eNB operations according to an embodiment of the present invention.

FIG. 5 is a flowchart illustrating eNB operations according to an embodiment of the present invention.

In reference to FIG. 5, an eNB may transmit reference signal information to a UE at step S510. The reference signal information may be information on the resources for transmitting the reference signal and may be transmitted to the UE through higher layer (Radio Resource Control (RRC)) signaling.

The reference signal information may include periodic reference signal information (hereinafter, referred to interchangeably as first RS information and CSI-RS configuration information) as the information for configuring periodic CSI reporting. The periodic reference signal information may be information on the reference signal transmitted periodically and, in detail, may include information on the periodic reference signal transmission positions.

The reference signal information may also include aperiodic reference signal information (hereinafter, referred to interchangeably as second reference signal information or AP-CSI-RS configuration information). The aperiodic reference signal information may be information on the reference signal transmitted aperiodically and, in detail, may include information on the aperiodic reference signal transmission positions.

The periodic reference signal information and the aperiodic reference signal information may be transmitted to the UE in two separate messages or one message.

The periodic reference signal information is formatted as shown in Table 2.

TABLE 2

```
-- ASN1START

CSI-RS-ConfigNZP-r11 ::=    →    → SEQUENCE {
    → csi-RS-ConfigNZPId-r11→    →    → CSI-RS-ConfigNZPId-r11,
    → antennaPortsCount-r11→    →    → ENUMERATED {an1, an2, an4, an8},
    → resourceConfig-r11 →    →    → INTEGER (0..31),
    → subframeConfig-r11 →    →    → INTEGER (0..154),
    → scramblingIdentity-r11→    → INTEGER (0..503),
    → qcl-CRS-Info-r11→    →    →    → SEQUENCE {
    →    → qcl-ScramblingIdentity-r11→    → INTEGER (0..503),
    →    → crs-PortsCount-r11 →    →    → ENUMERATED {n1, n2, n4, spare1},
    →    → mbsfn-SubframeConfigList-r11 → CHOICE {
    →    →    → → release→    →    →    →    → → NULL,
    →    →    → → setup    →    →    →    →    →    → SEQUENCE {
    →    →    → →         subframeConfigList →    → MBSFN-SubframeConfigList
    →    →    → → }
    →    → }→    →    →    →    →    →    →    →    →    →    →    →    → → OPTIONAL→-- Need ON
    → }→    →    →    →    →    →    →    →    →    →    →    →    →    →    →    → OPTIONAL, -- Need OR
    →...
}

-- ASN1STOP
```

In Table 2, the resource information (resourceConfig-r11) denotes a CSI-RS configuration index for use by the eNB to notify the UE of the CSI-RS transmission positions in an RB. In the current LTE standard, no restriction is specified for time averaging during the channel measurement of the UE.

The present invention is characterized in that the eNB transmits the aperiodic reference signal information to the UE to solve the above problem.

The aperiodic reference signal information may be formatted as shown in Table 3.

TABLE 3

```
-- ASN1START

AP-CSI-RS-ConfigNZP-r13 ::=   SEQUENCE {
   → csi-RS-ConfigNZPId-r13→   →    → CSI-RS-ConfigNZPId-r13,
   → antennaPortsCount-r13→    →    → ENUMERATED {an1, an2, an4, an8},
   → resourceConfig-r13 →      →    → INTEGER (0..31),
   → subframeConfig-r13 →      →    → INTEGER (0..154),
   → scramblingIdentity-r13→   →    → INTEGER (0..503),
   → qcl-CRS-Info-r13 →        →    → SEQUENCE {
   →    → qcl-ScramblingIdentity-r13→   → INTEGER (0..503),
   →    → crs-PortsCount-r13→   →    → ENUMERATED {n1, n2, n4, spare1},
   →    → mbsfn-SubframeConfigList-r13 → CHOICE {
   →    →    → release →   →   →   →   → NULL,
   →    →    → setup →     →   →   →   →   → SEQUENCE {
   →    →    →    →   → subframeConfigList →   → MBSFN-SubframeConfigList
   →    →    →   }
   →    → }   →   →   →   →   →   →   →   →   →   →   →   →   → OPTIONAL→-- Need ON
   → }   →   →   →   →   →   →   →   →   →   →   →   →   →   →   → OPTIONAL, -- Need OR
   → ...
}
```

It may be possible to define newly two terms to describe the aperiodic reference signal information.

Aperiodic CSI-RS (AP-CSI-RS)
Aperiodic CSI-RS measurement

Unlike the legacy CSI-RS, the AP-CSI-RS is transmitted by the eNB only when the AP-CSI-reporting is triggered. The aperiodic CSI-RS measurement may be an operation of performing channel measurement using the AP-CSI-RS.

If the AP-CSI-RS is received, the UE may perform channel measurement only with the AP-CSI-RS that is transmitted periodically. This results in applying a time restriction automatically.

The AP-CSI-RS may be used for performing channel measurement efficiently, and CSI-RS resources can be allocated more effectively by configuring AP-CSI-RS.

In order to use the AP-CSI-RS, the eNB may transmit to the UE the information as follows.

AP-CSI-RS configuration information
AP-CSI-RS indicator (or aperiodic reference signal indicator)

The eNB may transmit the aperiodic reference signal information through RRC signaling and include AP-CSI-RS configuration information.

The eNB may configure the AP-CSI-RS based on the AP-CSI-RS configuration information. The eNB may indicate AP-CSI-RS configuration and AP-CSI-RS-based CSI measurement report by configuring the AP-CSI-RS indicator in Downlink Control Information (DCI).

In detail, the AP-CSI-RS configuration information may be information indicating the AP-CSI-RS transmission positions. In Table 3, the resource information (resourceConfig-r13) indicates the AP-CSI-RS configuration index for use by the eNB to notify the UE of the AP-CSI-RS transmission positions in an RB.

The subframe information (subframeConfig-r13) is used for indicating the subframes carrying the AP-CSI-RS, and this indication may be made in various ways.

For example, the eNB may transmit subframe indices or a bitmap to the UE to inform the UE of the subframes carrying the AP-CSI-RS. The eNB may also configure a subframeConfig-r13 set as the information on a set of subframes carrying the AP-CSI-RS. The subframeConfig-r13 set may be configured with entries from INTEGER (0 . . . 154) constituting the subframeConfig-r13.

Accordingly, the eNB may configure the AP-CSI-RS transmission timings using the subframe information (subframeConfig) configured in the case when the AP-CSI-RS transmission is indicated by the AP-CSI-RS indicator. In this case, it may be possible to refer to the first method as described hereinafter.

It may also be possible for the eNB to notify the UE of the AP-CSI-RS transmission timings by configuring the subframe information (subframeConfig) and AP-CSI-RS period. In this case, it may be possible to refer to the second and third method as described hereinafter.

In the current LTE standard, it is specified that a UE can configure up to 3 pieces of NZP CSI-RS configuration information. Accordingly, the eNB may configure one or more pieces of AP-CSI-RS configuration information.

In the FD-MIMO system, CSI-RS beamforming may be applied to a very sharp beam to a terminal. At this time, the beamforming vector applied to the CSI-RS may be determined based on SRS or non-beamformed CSI-RS. Accordingly, if a wrong beamforming vector is applied to the CSI-RS, the beam may not be formed in an accurate direction to the UE. Accordingly, in the case of configuring a plurality of AP-CSI-RSs, it may be possible to improve the accuracy of the CSI report in such a way that the UE performs channel measurement based on the more accurately beamformed AP-CSI-RSs.

As described above, the reason for defining a new aperiodic reference signal in an RRC field is to indicate explicitly that the AP-CSI-RS is transmitted by the eNB only when AP-CSI reporting is triggered. In the case that the AP-CSI reporting is triggered, the UE performs channel measurement only on the AP-CSI-RS. Technically, it may be possible to perform the proposed AP-CSI-RS measurement and reporting using the NZP CSI-RS configuration information of Table 2, which is specified in the current standard, without defining the AP-CSI-RS. However, it is necessary to configure the P-CSI-RS and AP-CSI-RS separately as described above in order to use both the P-CSI-RS and AP-CSI-RS simultaneously.

After transmitting the reference signal information, the eNB may configure the AP-CSI-RS indicator at step S520. In the embodiment 2 or 3 in which the AP-CSI-RS is configured to be transmitted periodically, step S520 may be omitted.

The AP-CSI-RS indicator may be the information indicating whether to configure the AP-CSI-RS according to the aperiodic reference signal information set in the RRC field.

Even when the aperiodic reference signal information is set in the RRC field, if no AP-CSI report is required, it is not necessary for the eNB to transmit any aperiodic reference signal. Accordingly, the eNB may notify the UE whether an AP-CSI-RS is configured in the resources using the indicator.

The eNB may configure the AP-CSI-RS indicator with a DCI field and transmit the AP-CSI-RS indicator to the UE. The AP-CSI-RS indicator may be configured in the DCI field in such a way of adding a 1-bit AP-CSI-RS indicator to the DCI format 0/4 that is used for PUSCH scheduling. As described above, the 1-bit AP-CSI-RS indicator may be used to indicate whether the AP-CSI-RS is transmitted or not.

The eNB may also set a CSI Request field included in the uplink DCI to 1 for triggering AP-CSI-reporting and configure the UE to report AP-CSI-RS-based CSI using the 1-bit AP-CSI-RS indicator. In detail, the 1-bit AP-CSI-RS indicator may be configured to indicate an operation as follows.

AP-CSI-RS indicator indicating AP-CSI-RS transmission: Configuring AP-CSI-RS using the aperiodic reference signal information transmitted through RRC signal to generate AP-CSI.

AP-CSI-RS indicator indicating no AP-CSI-RS transmission: AP-CSI-RS transmission resources may be used for PDSCH transmission.

Although the description has been directed to the AP-CSI-RS indicator configuration method using the uplink DCI, the AP-CSI-RS indicator configuration method is not limited thereby.

A description is made of a method for configuring the AP-CSI-RS indicator using Transmit Power Control (TPC). Here, a TPC DCI means DCI format 3/3a. In detail, the TCP command field defined for TPC may be used as the P-CSI-RS indicator as shown in Table 4 or 5. It may be possible to define a new Radio Network Temporary Identifier (RNTI) for use of the DCI format 3/3a as the AP-CSI-RS indicator as well as the TPC.

TABLE 4

AP-CSI-RS indicator Field in DCI format 3a

| AP-CSI-RS indicator Field in DCI format 3A | Indication |
|---|---|
| 0 | First CSI-RS index configured with RRC information |
| 1 | Second CSI-RS index configured with RRC information |

TABLE 5

AP-CSI-RS indicator Field in DCI format 3

| AP-CSI-RS indicator Field in DCI format 3 | Indication |
|---|---|
| 0 | First CSI-RS index configured with RRC information |
| 1 | Second CSI-RS index configured with RRC information |
| 2 | Third CSI-RS index configured with RRC information |
| 3 | Fourth CSI-RS index configured with RRC information |

In reference to FIG. 4, the AP-CSI-RS indicator may indicate presence of at least one AP-CSI-RS configuration information configured based on the reference signal information. For example, if two AP-CSI-RSs are configured based on the aperiodic reference signal information, the AP-CSI-RS indicator is set to 0 to indicate the first AP-CSI-RS or 1 to indicate the second AP-CSI-RS. If no AP-CSI-RS indicator is configured in the DCI, it may be interpreted that no AP-CSI-RS is used.

The information carried in the AP-CSI-RS indicator may not include any specific CSI-RS index and, if the AP-CSI-RS indicator includes no AP-CSI-RS index, it may be possible to configure such that no AP-CSI-RS is applied.

In the example of Table 5, if the AP-CSI-RS indicator 0 includes no specific CSI-RS index, the AP-CSI-RS indicator 0 may be configured such that no AP-CSI-RS is applied. In this case, the AP-CSI-RS indicators 1, 2, and 3 may be configured as the first, second, and third CSI-RS indices, respectively, through RRC information.

If the eNB configures three AP-CSI-RSs, which are designated as the first, second, and third CSI-RS indices with the RRC information, the eNB may dynamically select and transmit to the UE at least one of the configured AP-CSI-RS indices using the CSI-RS indicator.

If the AP-CSI-RS index is not configured through RRC signaling, the UE may interpret the corresponding AP-CSI-RS indicator as a value indicating that AP-CSI-RS is not transmitted. In this case, the AP-CSI-RS resources may be used for PDSCH transmission as in the case of configuring the 1-bit AP-CSI-RS indicator.

For example, if four AP-CSI-RSs are configured by means of the second reference signal information, the AP-CSI-RS indicator may indicate the index of the AP-CSI-RS to be used among the configured AP-CSI-RSs.

However, if three AP-CSI-RS indices are configured by means of the second reference signal information while the AP-CSI-RS indicator indicates four AP-CSI-RS indices, the AP-CSI-RS indicator 4 for the fourth AP-CSI-RS index may be used to indicate that no AP-CSI-RS is applied.

It may be possible to consider an approach for configuring the AP-CSI-RS indicator by adding extra bits to DCI. In detail, the eNB may use DL DCI formats of DCI 1, DCI 1a, DCI 2C, and DCI 2D. This approach may be advantageous in terms that the UE is capable of identifying the AP-CSI-RS transmission, estimating AP-CSI-RS, and preparing feedback in advance.

Next, a description is made of the AP-CSI-RS indicator-based PDSCH RE mapping and rate matching method. If the AP-CSI-RS resources indicated by the AP-CSI-RS indicator and the CSI-RS resources configured by RRC are not overlapped, it may be possible to identify the PDSCH RE mapping and to perform rate matching using the union thereof. In more detail, when the UE that has not received any AP-CSI-RS receives PDSCH, it may be possible to send the UE the ZP CSI-RS configuration information for rate matching.

If the AP-CSI-RS indicator of 2 or more bits is included in the DCI format 0/4 that is used for PUSCH scheduling or if the DCI format 3 is used as shown in Table 5, it may be possible to configure a function of selecting AP-CSI-RS resources dynamically. A description thereof is made in more detail with reference to Table 6. Table 6 exemplifies a case where the AP-CSI-RS indicator is 2 bits. In Table 6, a CSI-RS index corresponds to one of the configured AP-CSI-RSs.

TABLE 6

| AP-CSI-RS indicator | Indication |
|---|---|
| 00 | First CSI-RS index configured with RRC information |

TABLE 6-continued

| AP-CSI-RS indicator | Indication |
|---|---|
| 01 | Second CSI-RS index configured with RRC information |
| 10 | Third CSI-RS index configured with RRC information |
| 11 | Fourth CSI-RS index configured with RRC information |

One of the AP-CSI-RS indicator values may include no specific AP-CSI-RS index, and the AP-CSI-RS indicator value including no AP-CSI-RS index may be configured to indicate that no AP-CSI-RS is applied. If an AP-CSI-RS index is not configured through RRC signaling, the UE may interpret that the corresponding AP-CSI-RS indicator value indicates no AP-CSI-RS transmission. In such a case, the AP-CSI-RS resources may be used for PDSCH transmission as in the case where 1-bit AP-CSI-RS indicator is configured.

For example, if the AP-CSI-RS indicator 00, in Table 6, does not include a specific CSI-RS index and it is configured that no AP-CSI-RS is applied, the AP-CSI-RS indicators 01, 10, and 11 may be configured as the first, second, and third CSI-RS indices configured with RRC information. If the eNB maps the three AP-CSI-RSs to the first, second, and third AP-CSI-RS indices configured with RRC information, the eNB may select the AP-CSI-RS resources dynamically for the UE. The UE may identify the PDSCH RE mapping based on the CSI-RS indicator and perform rate matching. If the AP-CSI-RS resources indicated by the AP-CSI-RS indicator and the CSI-RS resources configured by RRC are not overlapped, it may be possible to identify PDSCH RE mapping and perform rate matching using the union thereof.

Then the eNB may trigger aperiodic CSI reporting at step S530.

As described above, the eNB may trigger aperiodic CSI reporting with the AP-CSI-RS indicator. For example, the eNB may trigger AP-CSI-RS-based aperiodic CSI-reporting using the 1-bit or 2-bit AP-CSI-RS indicator. At this time, the eNB may use the CSI-RS request field configured for triggering the legacy CSI-RS-based aperiodic CSI-report and the AP-CSI-RS indicator configured for triggering the AP-CSI-RS-based AP-CSI report separately. The eNB may add a predetermined number of bits to the legacy CSI request field to indicate whether to trigger the AP-CSI-RS-based CSI report or the CSI-RS-based CSI report.

For example, the first or last bit of the CSI-RS field may be set to 1 to trigger the AP-CSI-RS-based CSI report or 0 to trigger the CSI-RS-based CSI report. It may also be possible to add the bit information described with reference to Tables 4 to 6 to the head or tail of the CSI-RS request filed to trigger the AP-CSI-RS-based CSI report.

After triggering the AP-CSI report, the eNB may transmit the reference signals at step S540.

In detail, if the eNB has triggered AP-CSI, it may transmit AP-CSI-RS based on the AP-CSI-RS information. At this time, the eNB may transmit to the UE the CSI-RS beamformed with a beamforming vector.

After transmitting the CSI-RS, the eNB may receive the CSI measured based on the CSI-RS.

The terms used in the present invention may be replaced by other terms, if necessary. For example, the term "AP-CSI-RS indicator" may be replaced by the term "AP-CSI-RS request field" or "aperiodic channel request information".

Figure 6:
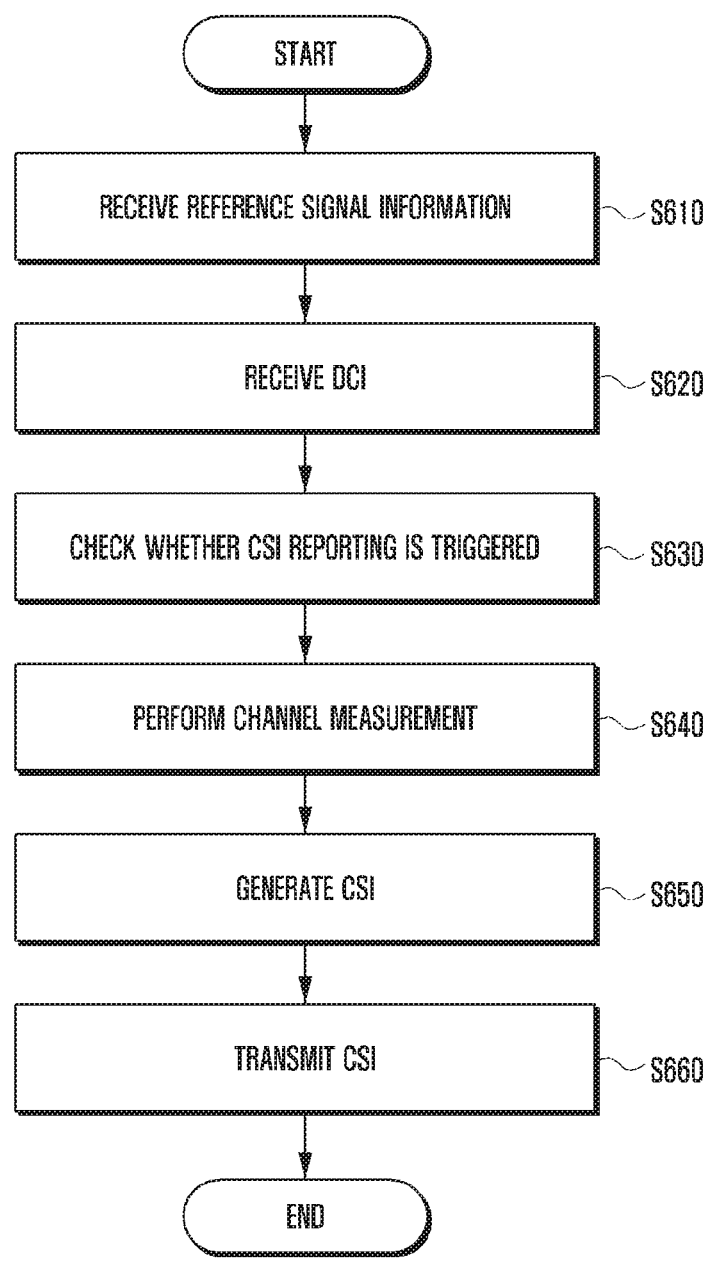
FIG. 6 is a flowchart illustrating UE operations according to an embodiment of the present invention.

FIG. 6 is a flowchart illustrating UE operations according to an embodiment of the present invention.

In reference to FIG. 6, the UE may receive reference signal information at step S610. The reference signal information may include periodic reference signal information and aperiodic reference signal information.

After receiving the reference signal information, the UE may receive DCI at step S621.

The UE may identify at step S630 whether an AP-CSI-RS indicator is configured and whether aperiodic CSI reporting is triggered based on the DCI.

In detail, the UE may identify whether an AP-CSI-RS indicator is configured and whether aperiodic CSI reporting is triggered based on the DCI based on the AP-CSI-RS indicator included in the DCI.

The AP-CSI-RS indicator may be delivered in the form of a predetermined number of bits or a bitmap to indicate whether an AP-CSI-RS is transmitted. The UE may determine on the basis of the AP-CSI-RS indicator whether an AP-CSI-RS is transmitted. If an AP-CSI-RS is transmitted, the UE may assume that AP-CSI-RS-based AP-CSI reporting is triggered.

For example, if the AP-CSI-RS indicator is set to 1, the UE may assume that the AP-CSI-RS is configured and the AP-CSI-RS-based CSI report is triggered. The eNB may indicate at least one of AP-CSI-RS configuration informations transmitted through RRC signaling with a 1-bit or 2-bit AP-CSI-RS indicator. The UE may identify the AP-CSI-RS configuration information to be used and AP-CSI-RS transmission resources positions based on the AP-CSI-RS indicator. However, if the number of pieces of AP-CSI-RS configuration information transmitted through RRC signaling increases, the number of bits of the AP-CSI-RS indicator may increase proportionally. For example, if the number of pieces of AP-CSI-RS configuration information is 7, a 3-bit AP-CSI-RS indicator may be used.

The DCI may include a CSI request field, which may be used to trigger periodic CSI-RS-based CSI reporting aperiodically. The CSI request field may be delivered in the form of a predetermined number of bits or a bitmap.

However, the eNB may add 1 bit or a predetermined number of bits to the legacy CSI-RS request field to trigger the CSI report measured based on the AP-CSI-RS. For example, the eNB may indicate to the UE whether to report the CSI measured based on the AP-CSI-RS using 1-bit information added to the head or tail of the legacy 1-bit or 2-bit CSI-RS request field. The UE may determine, based on the information included in the CSI-RS request field, whether a AP-CSI-RS-based CSI-RS report is triggered.

If it is determined that the aperiodic CSI reporting is triggered, the UE may perform channel measurement with the received CSI-RS at step S640.

The UE may acquire resource signal resource transmission resource information from the reference signal information and identify based on the reference signal information whether a reference signal is transmitted and whether CSI-RS reporting is triggered. If the reference signal information includes a plurality of reference signal configuration information, the UE may identify the reference signal configuration information to be used based on the DCI. The UE may perform channel measurement with the identified reference signal configuration information. For example, the UE may acquire the information on the CSI-RS transmission resources and the AP-CSI-RS transmission resources from the reference signal information and, if the DCI includes the AP-CSI-RS indicator, it may perform channel measurement using the AP-CSI-RS transmitted on the AP-CSI-RS transmission resources.

After the channel measurement, the UE may generate CSI at step S650 and transmit the CSI generated on one of the AP-CSI-RS resources at step S660.

Figure 7:
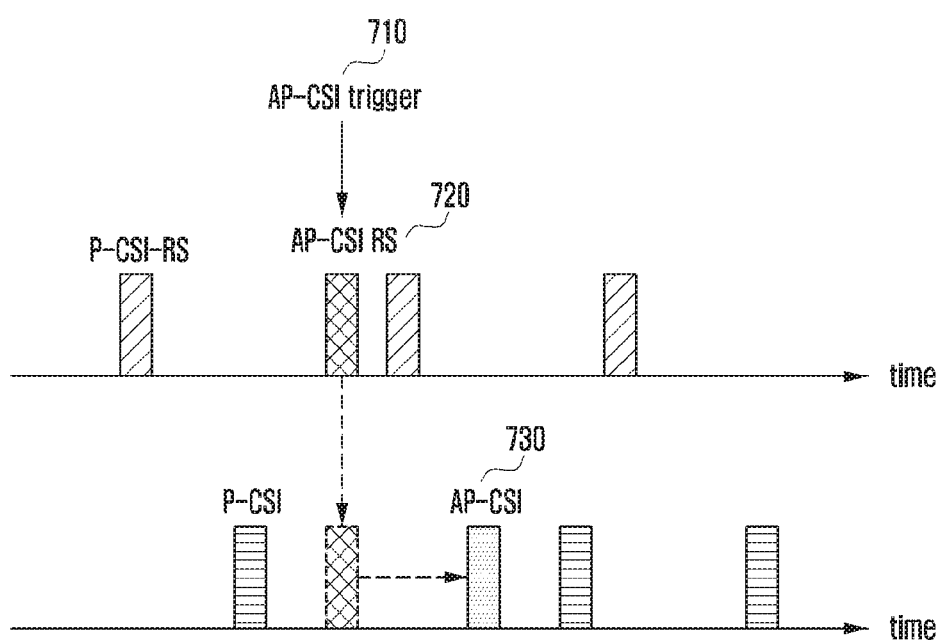
FIG. 7 is a diagram illustrating a first method for aperiodic CSI reporting according to an embodiment of the present invention.

FIG. 7 is a diagram illustrating a first method for aperiodic CSI reporting according to an embodiment of the present invention.

A description is made of the AP-CSI reporting method based on AP-CSI-RS and AP-CSI-RS measurement with reference to FIG. 7.

The eNB may transmit reference signal information to the UE through RRC signaling and trigger AP-CSI reporting, as denoted by reference number 710 of FIG. 7, to receive CSI measured based on the transmitted CSI-RS according to the reference signal information. At this time, the eNB may trigger beamformed CSI-RS-based CSI or non-beamformed CSI-RS-based CSI.

The eNB may use DCI for triggering CSI reporting as described above.

The eNB may also configure an AP-CSI-RS 720 in advance by transmitting aperiodic reference signal information through RRC signaling and use an AP-CSI-RS indicator to inform of AP-CSI-RS transmission. At this time, the AP-CSI-RS indicator may be added to a DCI field.

Although the CSI reporting is triggered at the same position as the AP-CSI-RS transmission resources as denoted by reference number 710 in the drawing, the present invention is not limited thereby. That is, the eNB may trigger the CSI reporting as a time point different from that of the AP-CSI-RS transmission time point.

The UE may measure channel state using the AP-CSI-RS transmitted after the CSI-RS reporting has been triggered.

If the AP-CSI-RS reporting is triggered, the UE may perform channel measurement using the configured AP-CSI-RS 720 to generate the CSI 730. The CSI measured based on the AP-CSI-RS 720 may be referred to as AP-CSI.

Then the eNB may transmit CSI information at subframe n+k as a predetermined timing. At this time, subframe n may denote the time when the AP-CSI reporting is triggered, and k may be a predetermined value.

For example, k may be set to 4 for FDD. In the present invention, however, the channel measurement may be performed after the receipt of the AP-CSI-RS; thus, it may be necessary to add extra measurement time. If the measurement time is elongated because a plurality of AP-CSI-RSs are configured, k may be set to a value greater than 4 (e.g., k=8).

As described above, the AP-CSI-RS-based CSI generation method operating in such a way of triggering CSI reporting after configuration of the AP-CSI-RS transmission resource through RRC signaling and transmitting the AP-CSI-RS for the case where an AP-CSI indicator is configured is advantageous in terms of transmitting PDSCH on the AP-CSI-RS transmission resource not used because of the aperiodicity.

Figure 8:
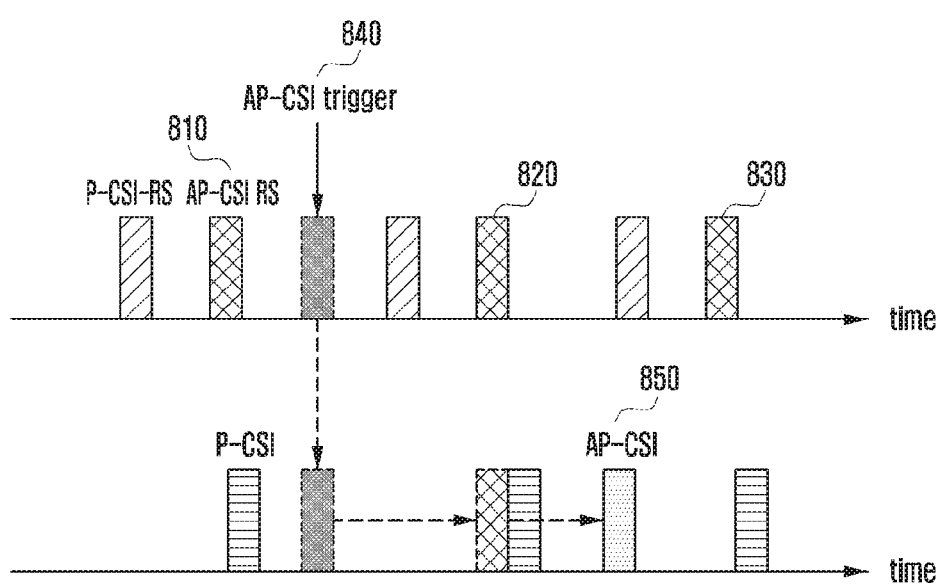
FIG. 8 is a diagram illustrating a second method for aperiodic CSI reporting according to an embodiment of the present invention.

FIG. 8 is a diagram illustrating a second method for aperiodic CSI reporting according to an embodiment of the present invention.

A description is made of the AP-CSI reporting method based on AP-CSI-RS and AP-CSI-RS measurement with reference to FIG. 7.

This embodiment is different from the embodiment of FIG. 7 in that the AP-CSI-RS is always configured periodically.

The eNB may transmit reference signal information to the UE through RRC signaling and trigger AP-CSI reporting, as shown in FIG. 7, to receive CSI measured based on the transmitted CSI-RS according to the reference signal information. At this time, the eNB may trigger beamformed CSI-RS-based CSI or non-beamformed CSI-RS-based CSI.

The eNB may use DCI for triggering CSI reporting as described above.

The eNB may also configure AP-CSI-RSs 810, 820, and 830 in advance by transmitting aperiodic reference signal information through RRC signaling and transmit the AP-CSI-RSs 810, 820, and 830 periodically as shown in FIG. 8.

If the AP-CSI reporting is triggered as denoted by reference number 840, the UE may perform channel measurement based on the AP-CSI-RS 820 transmitted after the AP-CSI-RS trigger to generate CSI 850. The CSI measured based on the AP-CSI-RS may be referred to as AP-CSI.

Then the eNB may transmit CSI information at subframe n+k as a predetermined timing. At this time, subframe n may denote the time when the AP-CSI reporting is triggered and k may denote a predetermined value.

In this embodiment, since the UE may perform channel measurement only after the receipt of any AP-CSI-RS, it may be necessary to add extra measurement time as in the first embodiment.

Accordingly, k may be set to 4 or a value greater than 4 (e.g., k=8).

As described above, the method of FIG. 8 is characterized in that the AP-CSI-RS is configured periodically so as to increase CSI-RS overhead in comparison with the method of FIG. 7. However, it may be possible to configure ZP CSI-RS to a legacy UE through RRC signal because the AP-CSI-RS is transmitted periodically. Accordingly, the method of FIG. 8 is advantageous in terms of minimizing the influence to the legacy UE.

Figure 9:
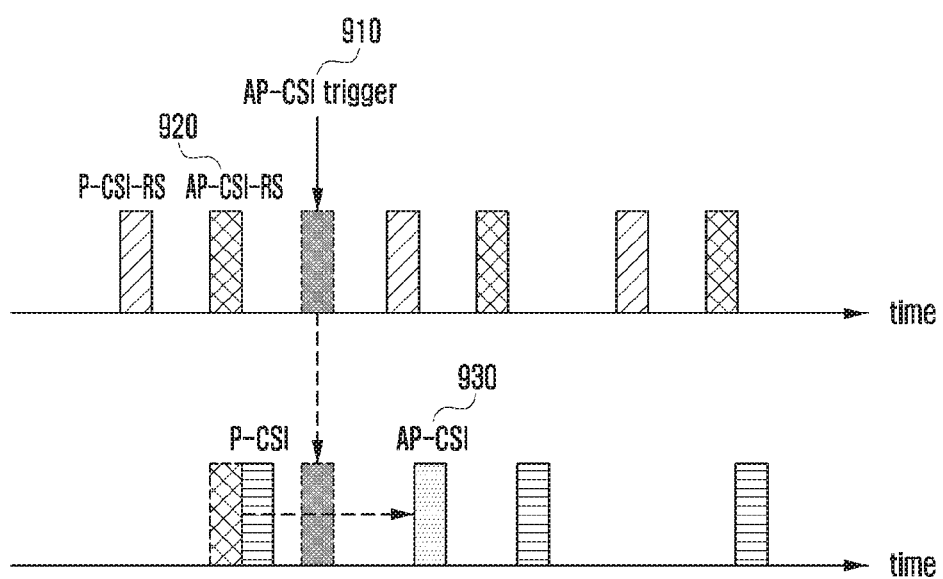
FIG. 9 is a diagram illustrating a third method for aperiodic CSI reporting according to an embodiment of the present invention.

FIG. 9 is a diagram illustrating a third method for aperiodic CSI reporting according to an embodiment of the present invention.

A description is made of the AP-CSI reporting method based on AP-CSI-RS and AP-CSI-RS measurement with reference to FIG. 9.

As described with reference to FIG. 8, if the channel measurement is performed with the AP-CSI-RS configured after triggering the AP-CSI reporting, the CSI transmission timing is likely to be delayed too long (e.g., subframe n+k).

As in the embodiment of FIG. 8, the AP-CSI-RS is configured periodically in FIG. 9. However, the embodiment of FIG. 9 is different from that of FIG. 8 in that the UE is always performing channel measurement on the AP-CSI-RS.

In reference to FIG. 9, the eNB may transmit reference signal information to the UE through RRC signaling and trigger AP-CSI reporting as denoted by reference number 910 to receive the CSI information generated based on the transmitted CSI-RS according to the reference signal information. At this time, the eNB may trigger beamformed CSI-RS-based CSI or non-beamformed CSI-RS-based CSI.

The eNB may use DCI for triggering CSI reporting as described above.

If the AP-CSI-RS is configured in a predetermined subframe (e.g., n+m (m<k)) after the AP-CSI triggering 910, the UE may perform channel estimation with the AP-CSI-RS configured after the AP-CSI triggering and transmit the corresponding CSI at the predetermined subframe n+k as shown in FIG. 8. At this time, subframe n may denote the time when the AP-CSI reporting is triggered and k may be a predetermined value.

However, if the AP-CSI-RS is not configured in the predetermined subframe (e.g., n+m (m+k)), the UE may transmit the CSI information in the subframe n+k as the predetermined timing using the AP-CSI 930 as a result of the channel measurement on the most recently received AP-CSI-RS 920 before AP-CSI-RS triggering. Here, m may be set to a value less than k. Here, k is a parameter defined in the 3GPP LTE standard Release 11 and set to 4 for FDD and one of the values listed in Table 1 for TDD. In detail, it is necessary to secure channel measurement time after receiving the AP-CSI-RS; thus, the eNB sets m to a value for CSI transmission at subframe n+k.

Accordingly, the aperiodic CSI reporting method may be implemented with a post-trigger measurement operation as shown in FIG. 8 or a pre-trigger measurement operation as shown in FIG. 9.

Figure 10:
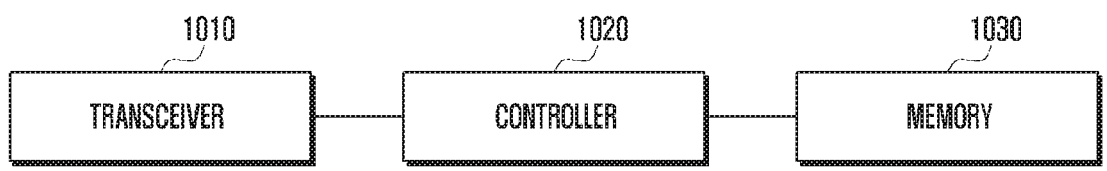
FIG. 10 is a block diagram illustrating a configuration of an eNB according to an embodiment of the present invention.

FIG. 10 is a block diagram illustrating a configuration of an eNB according to an embodiment of the present invention.

In reference to FIG. 10, the eNB may include a transceiver 1010, a controller 1020, and a memory 1030.

The transceiver 1010 may communicate signals with a network entity. The transceiver 1010 may transmit reference signal information to a UE through RRC signaling and DCI through a PDCCH. The transceiver 1010 may receive CSI from the UE.

The controller 1020 may control the transceiver to transmit the reference signal information to the UE through RRC signaling. At this time, the reference signal information may include periodic reference signal information for periodic CSI reporting and aperiodic reference signal information for aperiodic CSI reporting. The controller 1020 may notify the UE of AP-CSI-RS transmission resource positions using the aperiodic reference signal information.

The controller 1020 may transmit AP-CSI-RS subframe indices or a corresponding bitmap or a AP-CSI-RS subframe set information to the UE to indicate the AP-CSI-RS subframes (first method).

The controller 1020 may also transmit to the UE the subframe information and AP-CSI-RS period to notify the UE of the AP-CSI-RS transmission timings (second and third methods).

The controller 1020 may also configure an AP-CSI-RS indicator in the DCI and control the transceiver to transmit the indicator. The AP-CSI-RS is transmitted by the eNB only when the AP-CSI reporting is triggered and, if it is determined to transmit the AP-CSI-RS at predetermined positions, the controller 1020 may set the AP-CSI-RS indicator to 1. If the AP-CSI-RS indicator is set to 1, the controller may control to transmit data on the AP-CSI-RS transmission resources.

If two AP-CSI-RSs are configured based on the aperiodic reference signal information, the controller may configure the AP-CSI-RS indicator 0 to indicate the first AP-CSI-RS and the AP-CSI-RS indicator 1 to indicate the second AP-CSI-RS. At this time, if no AP-CSI-RS indicator value is configured in the DCI, the controller may configure such that no AP-CSI-RS is used.

If the aperiodic reference signal information includes at least one or more pieces of AP-CSI-RS configuration information, the controller 1020 may configure the AP-CSI-RS indicator of two bits.

The detailed description thereof has been made above and thus omitted herein.

The controller 1020 may trigger AP-CSI reporting to receive an AP-CSI report from the UE. The controller 1020 may configure the AP-CSI-RS indicator in the DCI to trigger AP-CSI-RS-based AP-CSI reporting. The controller 1020 may trigger the AP-CSI reporting using a 1-bit or 2-bit AP-CSI-RS indicator. At this time, the eNB may use the CSI-RS request field configured for triggering a legacy CSI-RS-based aperiodic CSI-report and the AP-CSI-RS indicator configured for triggering an AP-CSI-RS-based AP-CSI report separately. The controller 1020 may add a predetermined number of bits to the legacy CSI request field to indicate whether to trigger an AP-CSI-RS-based CSI report or a CSI-RS-based CSI report. The detailed description thereof has been made above and thus omitted herein.

The controller 1020 may also transmit a reference signal. The controller 1020 may transmit the reference signal at the resource positions determined based on the aperiodic reference signal information and the DCI. For example, the controller 1020 may transmit the CSI-RS periodically based on the periodic reference signal information. If the aperiodic CSI reporting is triggered, the controller 1020 may control to transmit the AP-CSI-RS using at least one of the resources indicated by the aperiodic reference signal information. At this time, if the aperiodic reference signal information indicates a plurality of resources, the controller 1020 may transmit the AP-CSI-RS information with the AP-CSI-RS indicator. The detailed description thereof has been made above and thus omitted herein.

The controller 1020 may also control to receive the CSI transmitted by the UE.

The memory 1030 may store the reference signal information transmitted to the UE. The memory 1030 may also store the AP-CSI-RS. The memory 1030 may also store the received CSI. Furthermore, the memory 1030 may also store the information generated or exchanged during the operation of the present invention.

Figure 11:
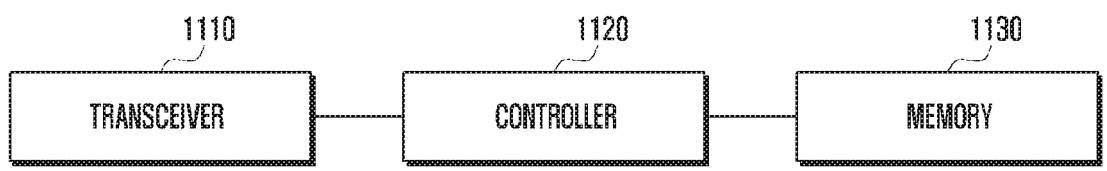
FIG. 11 is a block diagram illustrating a configuration of a UE according to an embodiment of the present invention.

FIG. 11 is a block diagram illustrating a configuration of a UE according to an embodiment of the present invention.

In reference to FIG. 11, the UE may include a transceiver 1110, a controller 1120, and a memory 1130.

The transceiver 1110 may communicate signals with a network entity. The transceiver 1110 may receive reference signal information through RRC signaling and DCI through a PDCCH. The transceiver 1110 may also receive CSI from the UE.

The controller 1120 may control the transceiver to receive reference signal information from the eNB. The reference signal information may include periodic reference signal information and aperiodic reference signal information.

The controller 1120 may control the transceiver to receive DCI. The controller 1120 may determine based on the received DCI whether an AP-CSI-RS indicator is configured and whether periodic CSI reporting is triggered.

In detail, the controller 1120 may determine based on the AP-CSI-RS indicator included in the DCI whether the AP-CSI-RS indicator is configured and whether aperiodic CSI-RS reporting is triggered.

The AP-CSI-RS indicator may be configured in the form of a few bits or a bitmap to indicate AP-CSI-RS transmission. The UE may identify on the basis of the AP-CSI-RS indicator whether any AP-CSI-RS is transmitted. If the AP-CSI-RS indicator is configured, the UE may identify that AP-CSI-RS-based AP-CSI reporting has been triggered.

The DCI may include a CSI-RS field for triggering periodic CSI-RS-based CSI reporting aperiodically. The CSI-RS request field may consist of a few bits or a bitmap. The controller 1120 may add 1 bit or a predetermined number of bits to the legacy CSI request field for use in triggering AP-CSI-RS-based CSI reporting. The UE may identify the AP-CSI-RS indicator to determine whether AP-CSI-RS transmission is configured and whether AP-CSI-RS-based CSI reporting is triggered. The detailed description thereof has been made above and thus omitted herein.

If the AP-CSI reporting is triggered, the controller 1120 may perform channel measurement based on the received AP-CSI-RS.

The controller 1120 may acquire reference signal transmission resource information from the reference signal information and identify the resources for use in transmitting the reference signal based on the DCI. The controller 1120 may control to perform channel measurement based on the reference signals received on the identified resources. For example, the controller 1120 may receive the CSI-RS transmission resources and the AP-CSI-RS transmission resources through the reference signal information and, if the DCI includes the AP-CSI-RS indicator, control the UE to perform channel measurement with the AP-CSI-RSs received on the AP-CSI-RS transmission resources.

The controller 1120 may generate CSI and transmit the CSI.

The memory 1130 may store the received reference signal information. The memory 1130 may also store the received reference signals (AP-CSI-RS or CSI-RS). The memory 1130 may also store the information generated or exchanged during the procedure of the present invention.

Meanwhile, the FD-MIMO system is characterized by M×N (vertical direction × horizontal direction) antennas arranged two-dimensionally. This means that the complexity of the UE that calculates the PMI and RI suitable for all FD-MIMO channels increases in proportion to the number of antenna ports in both the horizontal and vertical antenna ports. Since the number of available PMIs increases in proportion to the number of antenna ports, the number of bits required to notify the eNB of the UE-preferred PMIs increases too. In the case of the CSI feedback through PUCCH, the size of payload for containing the CSI is limited and this cause a problem in CSI feedback. In order to solve this problem, separation of the entire FD-MIMO channel information into N dimensions to feed back the CSI may be considered. For example, it may be possible to transmit horizontal and vertical direction RIs and PMIs separately. This makes it possible for the UE to select the best RI and PMI at a low complexity and facilitate satisfying the limited payload size even when the CSI is fed back through PUCCH. However, transmitting the horizontal and vertical direction RIs and PMIs separately and the CQI separately too provides no CQI value for the case where horizontal and vertical direction precoders are applied simultaneously, resulting in degradation of system throughput.

In order to make it possible for the UE to perform channel measurement on the plural transmit antennas while preventing the eNB from allocating excessive radio resources for transmitting CSI-RSs with a plurality of transmit antennas such as FD-MIMO, it may be possible to consider a method for transmitting the CSI-RSs separately in N dimensions.

For example, it may be possible to allow for measuring horizontal channels with N horizontal CSI-RS ports and vertical channels with M vertical CSI-RS ports. In detail, if two CSI-RSs are used, it is possible to identify the CSI using M+N CSI-RS ports for the M×N transmit antennas.

Equation 1 represents a method for selecting horizontal direction CSI and vertical direction CSI in measuring channels using M+N CSI-RS ports. Here, the CSI may include the RI and PMI.

$$p_r^H = \underset{r \in R^H, p \in P_r^H}{\operatorname{argmax}} \|H_r^H P_r^H\| \quad \text{[Equation 1]}$$

$$p_r^V = \underset{r \in R^V, p \in P_r^V}{\operatorname{argmax}} \|H_r^V P_r^V\|$$

Here, $R^H$ and $R^V$ denote, respectively, the sets of ranks in horizontal and vertical directions; $P_r^H$ and $P_r^V$ denote, respectively, the sets of rank-r precoders in horizontal and vertical directions; and $H_r^H$ and $H_r^V$ denote, respectively, the channel matrices in horizontal and vertical directions. By measuring channels with the M+N CSI-RS ports using equation 1, it may be possible to obtain the optimal RI and PMI.

The most advantageous way to reduce CSI-RS overhead is to identify the information on a large number of transmit antennas with a small number of CSI-RS ports. However, determining the RI, PMI, and CQI on all FD-MIMO channels arbitrarily through partial channel measurement may cause degradation of system performance.

Alternatively, it may be possible to identify the CSI using M×N CSI-RS ports for M×N transmit antennas.

Equation 2 represents a method for selecting vertical CSI and horizontal CSI when measuring channels with M×N CSI-RS ports. Here, the CSI may include the RI and PMI.

$$p_r^H = \underset{r \in R^H, p \in P_r^H}{\operatorname{argmax}} \sum^M \|H_r^H P_r^H\| \quad \text{[Equation 2]}$$

$$p_r^V = \underset{r \in R^V, p \in P_r^V}{\operatorname{argmax}} \sum^N \|H_r^V P_r^V\|$$

Here, M and N denote, respectively, the numbers of horizontal and vertical direction antenna ports; $R^H$ and $R^V$ denote, respectively, the sets of ranks in horizontal and vertical directions; $P_r^H$ and $P_r^V$ denote, respectively, the sets of rank-r precoders in horizontal and vertical directions; and $H_r^H$ and $H_r^V$ denote, respectively, the channel matrices in horizontal and vertical directions. By measuring channels with the M×N CSI-RS ports using equation 1, it may be possible to obtain the optimal RI and PMI.

Although this method has a drawback in requiring more CSI-RS resource in comparison with the above-described method, it is advantageous in terms of acquiring more accurate RI, PMI, and CQI by measuring all channels.

A description is made hereinafter of the method for selecting horizontal and vertical CSIs in measuring channels with M×N CSI-RS ports or M+N CSI-RS ports. The following terms may be used in the present invention.

$RI_H$: The horizontal rank indicator transmitted from the UE to the eNB.

$RI_V$: The vertical rank indicator transmitted from the UE to the eNB.

$RI_{HV}$: The horizontal and vertical rank indicator transmitted from the UE to the eNB.

$PMI_H$: The horizontal precoding matrix indicator transmitted from the UE to the eNB.

$PMI_V$: The vertical precoding matrix indicator transmitted from the UE to the eNB.

$CQI_H$: The UE-supportable data rate generated under the assumption of the application of only the horizontal precoding.

$CQI_V$: The UE-supportable data rate generated under the assumption of the application of only the vertical precoding.

CQI: The UE-supportable data rate generated under the assumption of the application of both the horizontal and vertical precodings.

Although the description is made with specific terms such as horizontal CSI and vertical CSI, it may be possible to use general terms such as first CSI and second CSI.

Figure 12:
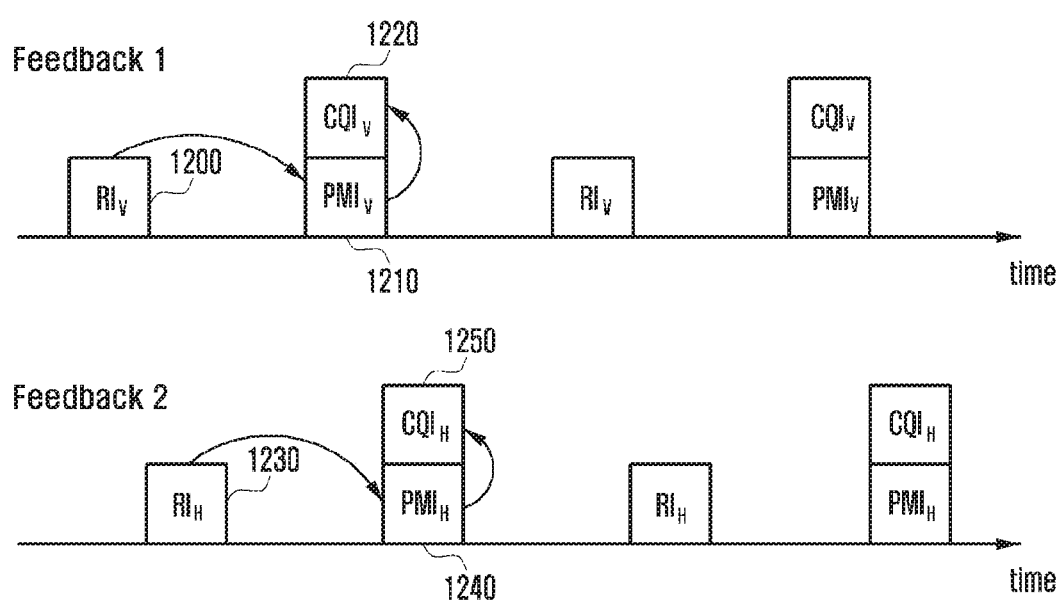
FIG. 12 is a diagram illustrating a CSI transmission method of a UE according to an embodiment of the present invention.

FIG. 12 is a diagram illustrating a CSI transmission method of a UE according to an embodiment of the present invention.

In reference to FIG. 12, each arrow shows how one type of CSI contributes to the interpretation of another type of CSI. If an arrow starts from $RI_V$ 1200 to $PMI_V$ 1210, this means that the $PMI_V$ is interpreted differently depending on the value of the $RI_V$ 1200.

In FIG. 12, the RI, PMI, and CQI are transmitted in the state of being associated with each other. That is, for the case of Feedback 1, the $RI_V$ indicates the rank of the precoding matrix indicated by the $PMI_V$ following $RI_V$. In the case that the eNB transmits a signal at a rank indicated by the $RI_V$ and the precoding matrix of the corresponding rank that is indicated by the $PMI_V$ is applied to the signal, the $CQI_V$ corresponds to the available data rate of the UE or a corresponding value. As with Feedback 1, Feedback 2 may be transmitted with the relationship among the RI, PMI, and CQI.

Configuring plural feedback transmissions for plural transmit antennas of the FD-MIMO eNB in order for the UE to report CSI to the eNB may be one of various CSI reporting methods for FD-MIMO.

Such a method is advantageous in terms of needing no extra implementation for a UE to generate and report FD-MIMO CSI. However, the CSI reporting method of FIG. 12 is disadvantageous in that the expected FD-MIMO system performance is insufficient.

The expected FD-MIMO system performance is insufficient because configuring multiple feedbacks for the UE to report CSI to the eNB is insufficient for identifying the precoding in the case of applying FD-MIMO. The UE transmits only CQI for each feedback and does not transmit the CQI generated under the assumption of plural FD-MIMO antennas. In the case that the UE reports only the $CQI_H$ and $CQI_V$ for the case of applying the precoders corresponding to $PMI_H$ and $PMI_V$, the eNB has to determine the CQI for the case where both the vertical and horizontal precoders are applied implicitly. If the eNB determines the CQI for the case where both the vertical and horizontal precoders are applied implicitly based on the CQIs for the cases where the vertical and horizontal precoders are respectively applied, this may cause degradation of the system performance. Hereinafter, a description is made of the method and apparatus for an eNB to transmit reference signals to a UE and to receive CSI transmitted by the UE.

Figure 13:
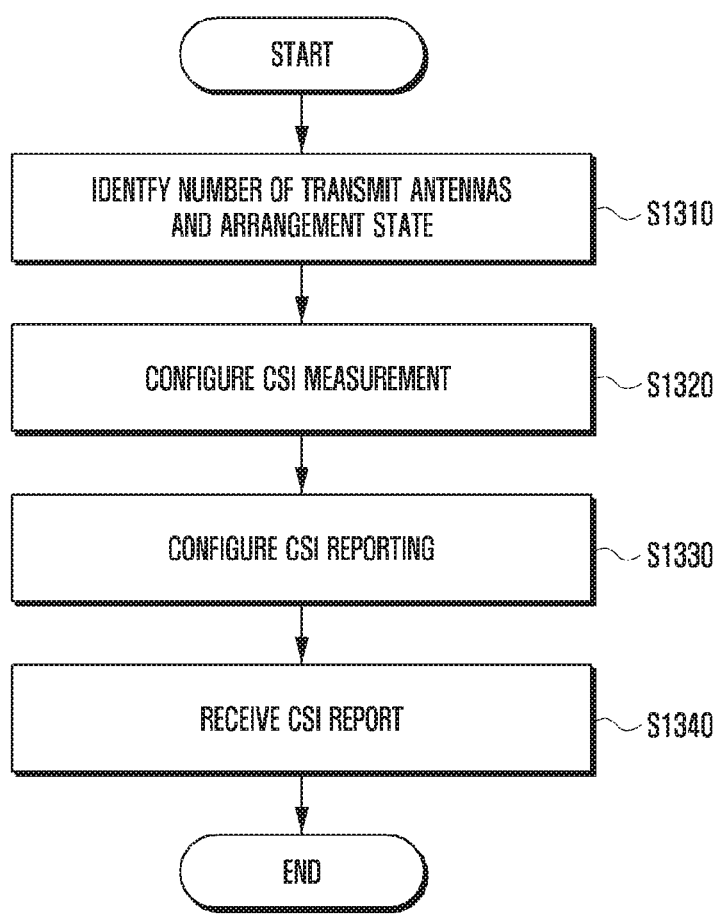
FIG. 13 is a diagram illustrating a CSI reception procedure of an eNB according to an embodiment of the present invention.

FIG. 13 is a diagram illustrating a CSI reception procedure of an eNB according to an embodiment of the present invention.

In reference to FIG. 13, the eNB may identify a number of transmit antennas and antenna arrangement state at step S1310. The eNB may identify the number of transmit antennas of its FD-MIMO transmitter and 2-dimensional arrangement of the antennas.

After identifying the number of transmit antennas and antenna arrangement state, the eNB may configure channel state information measurement to receive CSI at step S1320.

The CSI may include first CSI and second CSI, and the eNB may configure a UE to measure the first and second CSI by transmitting measurement configuration information to the UE through higher layer signaling (e.g., RRC signaling).

Each of the first and second CSIs may include at least one of horizontal and vertical CSI.

For example, the eNB may transmit to the UE information instructing the UE to calculate the CQI carried in the second CSI by applying the PMI included in the first CSI along with the PMI included in the second CSI and to calculate the CQI carried in the second CSI by applying the second CSI along with the PMI included in the first channel state.

The eNB may also transmit to the UE information instructing the UE to calculate CQI based on one of the first and second CSIs.

The eNB may also transmit to the UE configuration information including CSI measurement period and subframe offset for use in measuring horizontal and vertical CSIs. The eNB may also configure maximum values of the horizontal and vertical ranks to the UE depending on the case. The eNB may also transmit to the UE one of the horizontal and vertical ranks that is set to 1. The eNB may also transmit to the UE configuration information instructing the UE to measure and report the horizontal and vertical status information alternately.

The eNB may transmit to the UE the measurement configuration information for receiving the RIs included in the horizontal and vertical CSIs at a time. After configuring the CSI measurement, the eNB may transmit CSI reporting configuration information to the UE at step S1330.

The eNB may transmit to the UE the configuration information through higher layer signaling to instruct the UE to transmit the first and second CSIs. The eNB may also transmit to the UE configuration information using the DCI.

As described above, each of the first and second CSIs may include at least one of the horizontal and vertical CSIs. Thus the eNB may transmit to the UE configuration information for the UE to report the horizontal and vertical CSIs. For example, the configuration information may include the CSI reporting period and subframe offset. The eNB may also use the DCI to configure the UE to report the CSI aperiodically.

A description is made in detail later of the method for an eNB to configure a UE to measure and report CSI.

The eNB may receive the CSI transmitted by the UE at step S1340.

Figure 14:
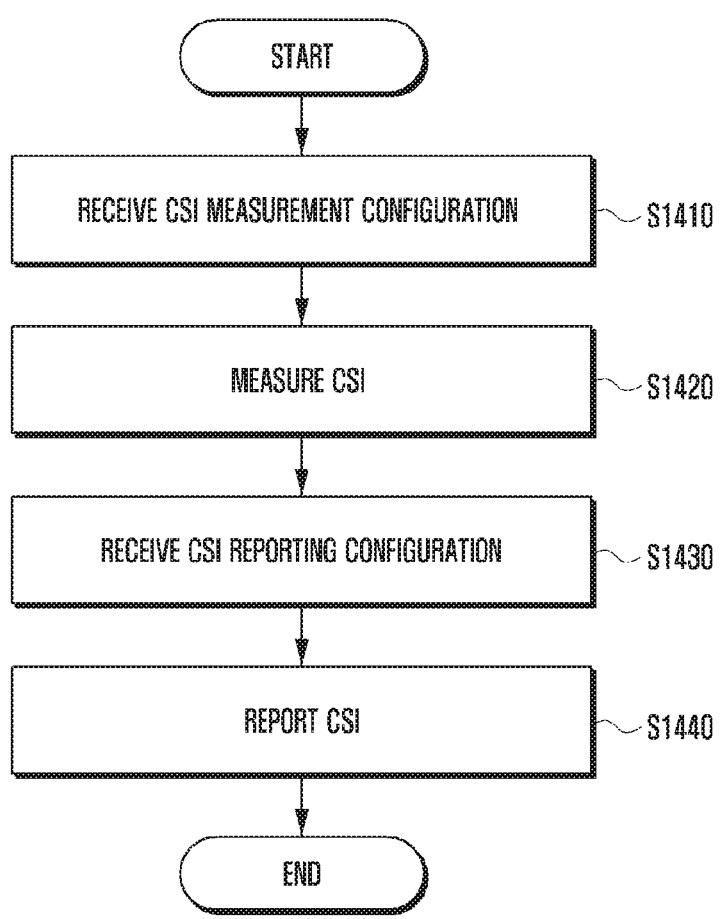
FIG. 14 is a flowchart illustrating a CSI transmission procedure of a UE according to an embodiment of the present invention.

FIG. 14 is a flowchart illustrating a CSI transmission procedure of a UE according to an embodiment of the present invention.

In reference to FIG. 14, the UE may receive CSI measurement configuration information from an eNB at step S1410. As described above, the CSI may include the first and second CSIs, and the UE may receive the configuration information for measuring the first and second CSIs.

If the CSI measurement configuration information is received, the UE may generate the CSIs according to the CSI measurement configuration at step S1420.

Then the UE may receive CSI reporting configuration from the eNB at step S1430. The UE may receive the configuration for reporting the first and second CSIs.

It may also be possible to use the DCI to trigger aperiodic CSI reporting.

The UE may report the CSI to the eNB according to the CSI reporting configuration at step S1440. In the case that the aperiodic reporting is triggered, the UE may report the measured CSI at a reporting time point.

Figure 15:
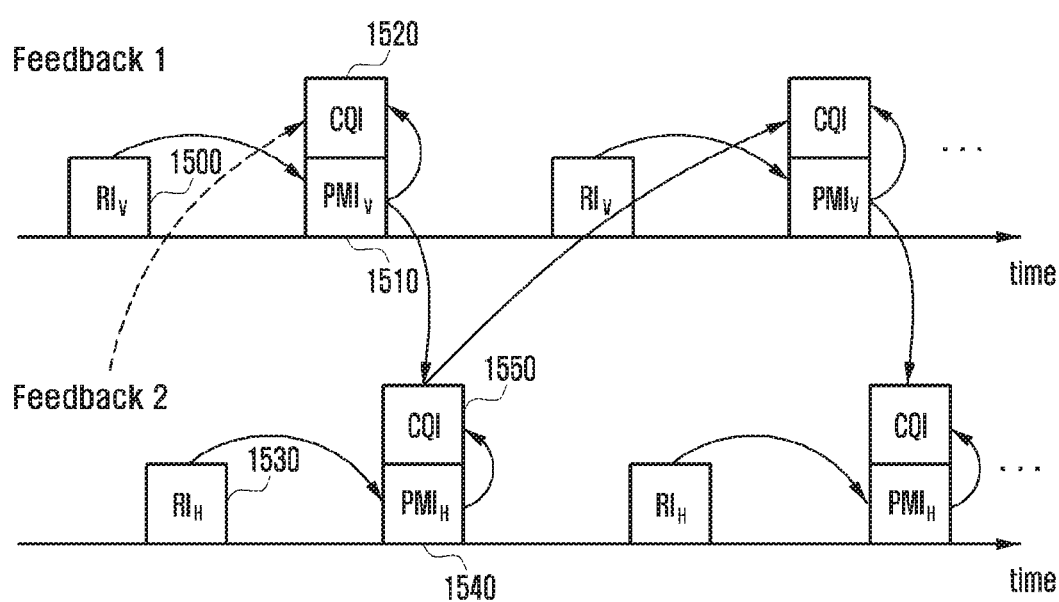
FIG. 15 is a diagram illustrating a first CSI reporting method of a terminal according to an embodiment of the present invention.

FIG. 15 is a diagram illustrating a first CSI reporting method of a terminal according to an embodiment of the present invention.

In reference to FIG. 15, the UE may report two CSIs with two feedback signals as in the embodiment of FIG. 12. The UE reports the CQI for the case where the precoding is applied in both the vertical and horizontal directions using both Feedback 1 and Feedback 2. That is, the UE may generate the CQI 1520 (or 1550) for the case where the corresponding precodings are simultaneously applied based on the $PMI_V$ and $PMI_H$ generated respectively from the Feedback 1 and Feedback 2.

In FIG. 15, the UE may generate the $RI_V$ 1500 and report it to the eNB. The UE may also determine the $PMI_V$ that is the most suitable for the rank indicated by the $RI_V$ 1500 and then report to the eNB the CQI 1520 and $PMI_H$ 1510 for the case where both the precoding indicated by the corresponding $PMI_V$ and the precoding indicated by the $PMI_H$ transmitted in the previous Feedback 2 are applied.

The $PMI_V$ 1510 may also be used to generate the CQI of Feedback 2. The UE may generate and report the $RI_V$ 1530 in Feedback 2. The UE may also determine the $PMI_H$ 1540 that is the most suitable for the rank indicated by the $RI_V$ 1530 and then report to the eNB the CQI 1550 for the case where both the precoding indicated by the corresponding $PMI_H$ 1540 and the precoding indicated by the previously transmitted $PMI_V$ 1510 are applied.

In order for the UE to report to the eNB the CQI for the case where both the precoders indicated by the $PMI_H$ and $PMI_V$ are applied, there are some requirements as follows.

First, the eNB may send the UE the information on the relationship among the feedbacks during the configuration of multiple feedbacks to the UE through higher layer signaling (e.g., RRC signaling). The UE may generate CQI based on the information.

In the embodiment of FIG. 15, the eNB may transmit to the UE the information instructing the UE to calculate the CQI of Feedback 2 by applying the PMI of Feedback 1 along with the PMI of Feedback 2 and to calculate the CQI of Feedback 2 by applying the PMI of Feedback 2 along with the PMI of Feedback 1.

Second, it is necessary to define how to determine the CQI for the case where multiple precoders are applied. In the case of calculating CQI by applying a single precoder, the UE may calculate CQI under the assumption that the precoder designated by means of the RI and PMI that it has transmitted is applied to the downlink; however, in the case of the CQIs 1520 and 1550, the UE calculates them under the assumption that two precoders are applied to the downlink simultaneously. At this time, the UE may interpret the application of two precoders as a Kronecker product. The Kronecker product may be defined by two matrices as follows.

$$A \otimes B = \begin{bmatrix} a_{11}B & \cdots & a_{1n}B \\ \vdots & \ddots & \vdots \\ a_{m1}B & \cdots & a_{mn}B \end{bmatrix}$$ [Equation 3]

In Equation 3, A and B may be replaced by the precoding matrices indicated respectively by the $PMI_H$ and $PMI_V$. The UE may identify the precoder for the case where two precoders are simultaneously applied using Equation 3. Accordingly, the UE may calculate CQI 1520 (or 1550) under the assumption that the precoder obtained by applying Equation 3 to the precoding matrices indicated by the $PMI_H$ and $PMI_V$ is applied to the downlink.

Meanwhile, in order to identify the precoder for the case where two precoders are simultaneously applied using the Kronecker product of Equation 3, it is necessary for the UE and the eNB to operate differently depending on the rank informed by the UE. Methods to achieve this are proposed in the present invention.

Method 1: The eNB may always set one of $RI_V$ and $RI_H$ to rank 1. In the case that the CQI is transmitted along with the $RI_H$ using the Feedback 2 in FIG. 15, the $RI_V$ may be restricted so as to be always set to 1. In this case, if two precoders are applied simultaneously, the ranks supported by the UE may be determined based on the $RI_H$. That is, the $RI_H$ may be set to 1 in order for the UE to rank 1 or to 0 in order for the UE to support rank 2. The UE and the eNB may operate in the FD-MIMO system under this assumption.

Method 2: The eNB and the UE may determine the rank supportable by the UE in the case where both the vertical and horizontal precoders are simultaneously applied using an equation as follows:

$$rank_{HV} = rank(RI_H) \times rank(RI_V).$$ [Equation 4]

That is, the UE and the eNB assume that the rank for the case where the vertical and horizontal precoders are simultaneously applied is the product of the ranks supported in the respective directions. For example, if the UE transmits to the eNB the $RI_H$ to indicate rank 2 and the $RI_V$ to indicate rank 3, the eNB and the UE assume rank 6 for the case where all precoders are applied. In the LTE/LTE-A, if the UE send the eNB the RI set to a value indicating rank 2 or higher, it may send the eNB two CQI values simultaneously. This is because the eNB transmits two codewords to the UE for the case of rank 2 or higher; thus, the UE has to report two CQIs for the respective codewords.

In the method of Equation 4, the UE may transmit two CQI values in the CQI 1550 for the case where the rank, when the precoders derived by equation 2 are all applied even through the $RI_H$ 1530 of Feedback 2 is set to 1, is 2 or higher. Also, the eNB may receive the CQI 1550 under the assumption that two CQI values are transmitted in the CQI 1550 in the case where the rank, when the precoders derived by Equation 2 are all applied even through the $RI_H$ 1530 of Feedback 2 is set to 1, is 2 or higher.

Figure 16:
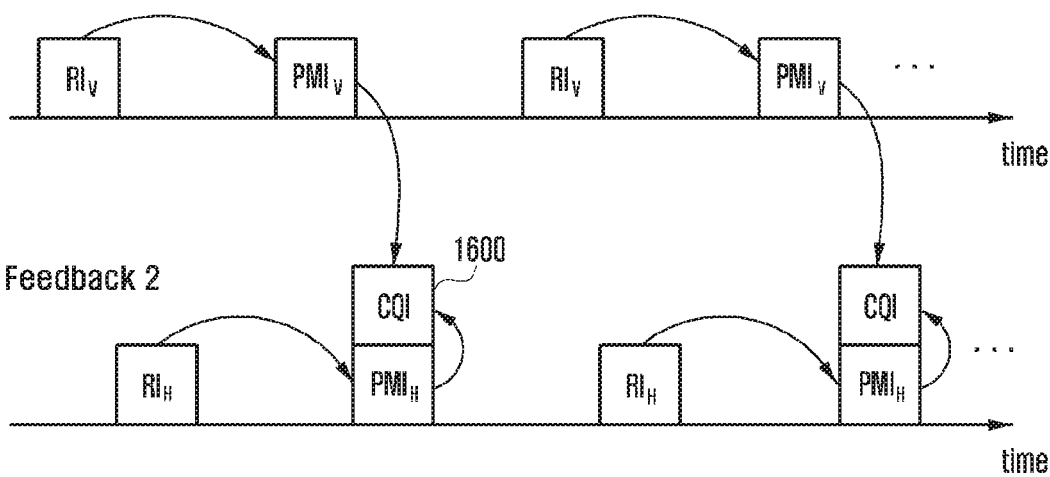
FIGS. 16 and 17 are diagrams illustrating a second CSI reporting method of a UE according to an embodiment of the present invention.
Figure 17:
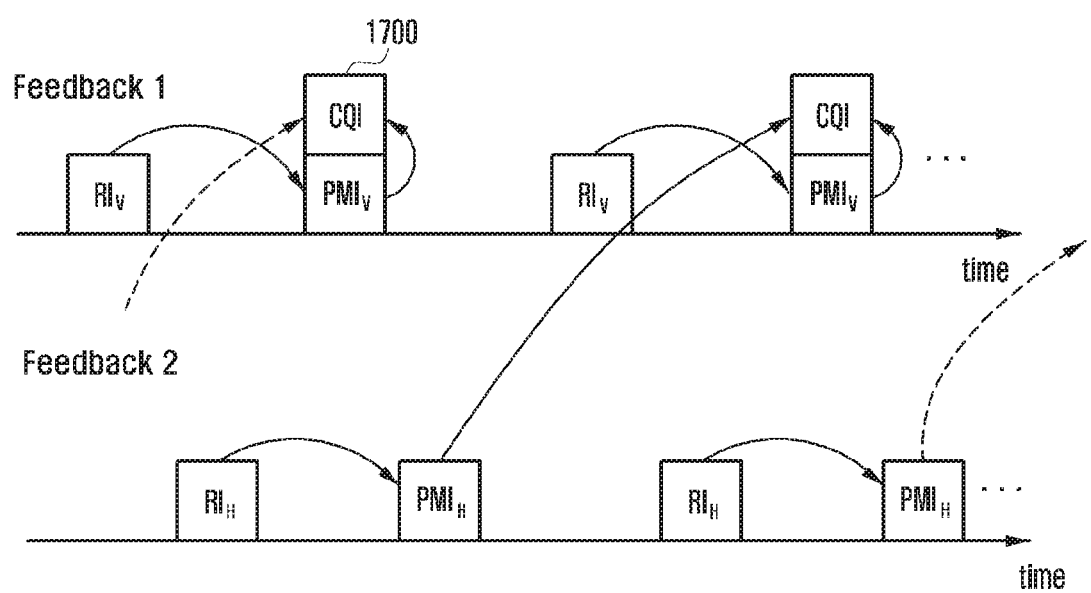

FIGS. 16 and 17 are diagrams illustrating a second CSI reporting method of a UE according to an embodiment of the present invention.

In reference to FIG. 16, the UE may generate $RI_V$ and then determine $PMI_V$ as indicated by the $RI_V$ for Feedback 1.

Likewise, the UE may generate $RI_H$ and then determine $PMI_H$ as indicated by the $RI_H$.

At this time, the UE may not generate CQI for Feedback 1 and instead may generate CQI 1600 for Feedback 2.

That is, the UE may generate CQI 1600 using the $PMI_V$ of Feedback 1 and the $PMI_H$ of Feedback 2 and transmit the CQI 1600 to the eNB.

In a similar way, in the embodiment of FIG. 17, the UE may generate the CSI 1700 only for Feedback 1 and report the CSI 1700 to the eNB.

In this embodiment, the UE transmits horizontal and vertical CSIs alternatively. Although the horizontal and vertical CSIs can be transmitted at the same interval in this way, this method may not be appropriate for the real system. That is, it may be advantageous in terms of optimizing system throughput to transmit one of the horizontal and vertical CSIs at an interval and the other at another interval shorter than that interval.

Figure 18:
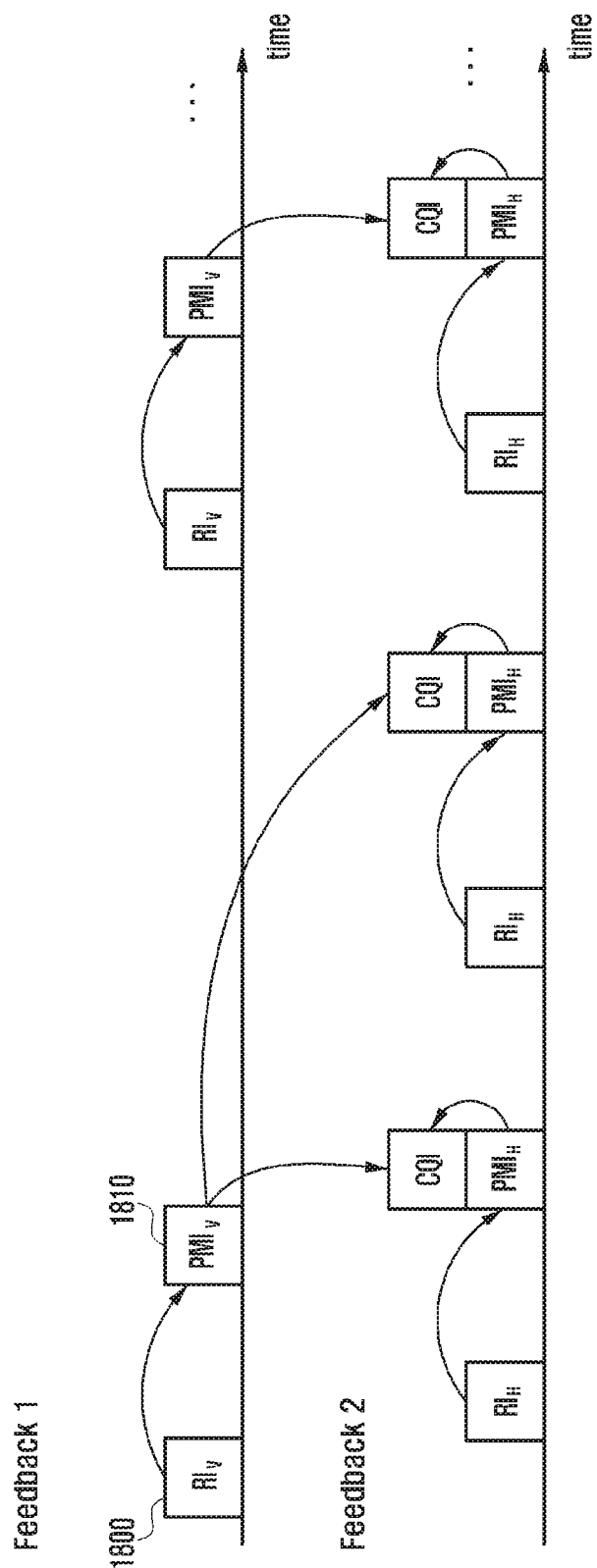
FIG. 18 is a diagram illustrating a third CSI-RS reporting method of a UE according to an embodiment of the present invention.

FIG. 18 is a diagram illustrating a third CSI-RS reporting method of a UE according to an embodiment of the present invention.

In reference to FIG. 18, in the case that the vertical direction channel is not changing frequently, the eNB may set the transmission interval of the RI 1800 and PMI 1810 of Feedback 1 to a time period shorter than that of the horizontal CSI transmission interval. Setting the horizontal and vertical CSI transmission intervals to time periods of different lengths may be applied to all of the various embodiments of the present invention. The horizontal and vertical CSI transmission intervals and ranks may be configured differently depending on the configuration of the eNB.

In detail, in order for the UE to report the CSIs to the eNB at different intervals, the eNB should be able to configure the intervals. That is, if it may be possible for the UE to report different-direction CSIs, the eNB may transmit to the UE the configuration information as follows.

First CSI: horizontal CSI ($RI_H$, $PMI_H$) transmission interval and frame offset Second CSI: vertical CSI ($RI_V$, $PMI_V$) transmission interval and subframe offset The subframe offset may be used for determining the position of the subframe for real transmission during the interval. For example, if the interval is 10 msc and the subframe offset is 5, the UE may transmit the CSI at subframe 5 during every interval of 10 msec.

The UE may report the horizontal and vertical ranks to the eNB according to different rank restrictions. The rank restriction means that the rank measured by the UE based on the reference signal is restricted to a maximum value preconfigured by the eNB. Restricting the maximum value of the rank for the UE is a part of the system optimization procedure in view of the eNB in a mobile communication system. In order to restrict the horizontal and vertical ranks separately, the eNB may transmit to the UE the information as follows.

First CSI: maximum value of horizontal rank k

Second CSI: maximum value of vertical rank

Meanwhile, if the UE reports CSIs to the eNB according to different feedback configurations, Feedback 1 and Feedback 2 may collide depending on the configuration. Here, collision means the situation when the Feedback 1 CSI and Feedback 2 CSI are transmitted in the same time period.

If a collision occurs because of the multiple feedback configurations, the UE may report one, but not the other, of the CSIs of Feedback 1 and Feedback 2 to the eNB. Accordingly, when multiple feedback configurations exist, transmission of part of the CSIs may fail. Hereinafter, a single feedback configuration method is described.

Figure 19:
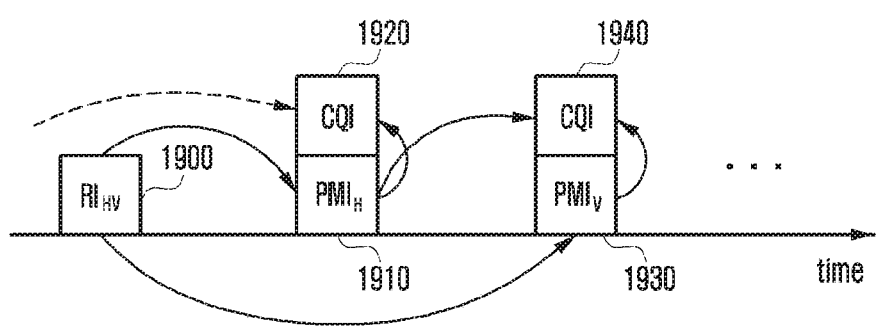
FIG. 19 is a diagram illustrating a fourth CSI reporting method of a UE according to an embodiment of the present invention.

FIG. 19 is a diagram illustrating a fourth CSI reporting method of a UE according to an embodiment of the present invention.

In reference to FIG. 19, the UE may report the horizontal and vertical ranks to the eNB by transmitting $RI_{HV}$ 1900. At this time, $RI_{HV}$ 900 may indicate the horizontal and vertical ranks simultaneously. Table 7 shows an example of a method for reporting horizontal and vertical ranks with $RI_{HV}$. The eNB may transmit to the UE the information as shown in Table 7 and instruct the UE to transmit the $RI_{HV}$ indicating horizontal and vertical ranks simultaneously.

TABLE 7

Method of reporting horizontal and vertical ranks with $RI_{HV}$

| $RI_{HV}$ | Horizontal rank | Vertical rank |
|---|---|---|
| 000 | 1 | 1 |
| 001 | 2 | 1 |
| 010 | 3 | 1 |
| 011 | 4 | 1 |
| 100 | 1 | 2 |
| 101 | 2 | 2 |

For example, if the UE reports the $RI_{HV}$ 1900 set to 101 to the eNB, the eNB may identify that the horizontal rank is 2 and the vertical rank is 2.

In this way, the eNB may identify the horizontal and vertical ranks based on the $RI_{HV}$ 1900 transmitted by the UE.

The eNB may identify the horizontal and vertical precoders and available reception data rate based on the horizontal and vertical PMIs and CQIs indicated by $RI_{HV}$ 1900.

In such a way of transmitting RI, PI, and CQI alternatively in one feedback, it is possible to avoid a collision among plural feedbacks.

In FIG. 19, the horizontal and vertical ranks may have different values according to the $RI_{HV}$ reported by the UE.

The precoding matrix indicated by the $PMI_H$ 1910 is determined according to the horizontal rank indicated by the $RI_{HV}$ 1900. The UE may also report to the eNB the CQI 820 for the case where the precoding matrix is indicated by the $PMI_H$ 1910 and the precoding matrix is indicated by the previously transmitted $PMI_V$. Likewise, the precoding matrix indicated by the $PMI_V$ 1930 may be determined according to the vertical rank indicated by the $RI_{HV}$ 1900. The UE may also transmit the CQI 1940 under the assumption that the precoding matrix indicated by the $PMI_V$ 1930 and the precoding matrix indicated by the $PMI_H$ 1910 are simultaneously applied.

The UE may calculate the precoding matrix for generating the CQIs 1920 and 1940 as the Kronecker product of two precoding matrices as shown in Equation 3. As described above, the horizontal and vertical CSIs transmission intervals may be set to different values.

Figure 20:
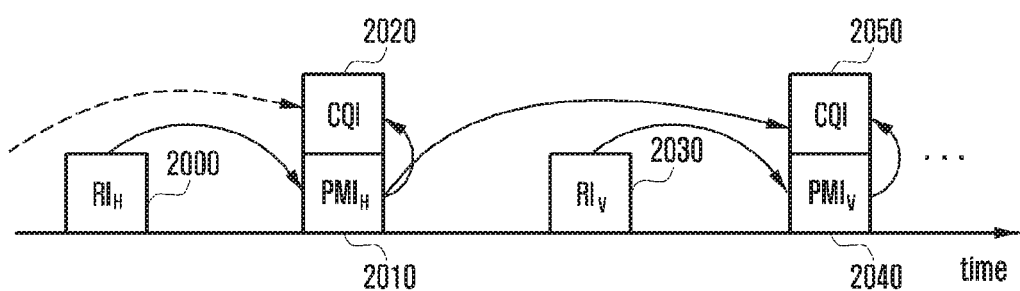
FIG. 20 is a diagram illustrating a fifth CSI reporting method of a UE according to an embodiment of the present invention.

FIG. 20 is a diagram illustrating a fifth CSI reporting method of a UE according to an embodiment of the present invention.

Unlike the embodiment of FIG. 19 in which the horizontal and vertical ranks are indicated by the $RI_{HV}$ as shown in Table 7, the horizontal and vertical ranks are indicated respectively by $RI_H$ and $RI_V$ in FIG. 20.

In FIG. 20, the UE determines the $RI_H$ 2000 and then the $PMI_H$ 2010 and CQI 2020 based thereon. Here, the CQI 2020 may be the CQI for the case where the precoding matrix indicated by the $PMI_H$ 2010 and the precoding matrix indicated by the previously transmitted $PMI_V$ are applied simultaneously. The UE may report the $RI_H$2000, $PMI_H$ 2010, and CQI 2020 to the eNB.

The UE may also determine the $RI_V$ 2030 first and then the $PMI_V$ 2040 and the CQI 2050 based thereon. Here, the CQI 2050 may be the CQI for the case where the precoding matrix indicated by the $PMI_V$ 2040 and the precoding matrix indicated by the previously transmitted $PMI_H$ 2010 are applied simultaneously. The UE may report the $RI_V$ 2030, $PMI_V$ 2040, and CQI 2050 to the eNB.

Here, the UE may assume the precoding matrix applied for generating the CQIs 2020 and 2050 as the Kronecker product of two precoding matrices as shown in Equation 3.

In FIG. 20, the UE may update the horizontal and vertical ranks separately. The UE may calculate the rank to be assumed for generating CSI (e.g., CQI) using Equation 4.

That is, the UE may assume the rank for generating the CQIs 2020 and 2050 as the product of the ranks respectively indicated by the $RI_H$ 2000 and $RI_V$ 2030. If the product of the ranks respectively indicated by the $RI_H$ 2000 and $RI_V$ 2030 is 1 during the period for transmitting the CQIs 2020 and 2050, one CQI is transmitted; but, if the product is equal to or greater than 2, two CQIs may be transmitted.

Even in the case of reporting the $RI_H$ 2000 and $RI_V$ 2030 separately, the horizontal and vertical CSIs transmission intervals and ranks may be set to different values.

Figure 21:
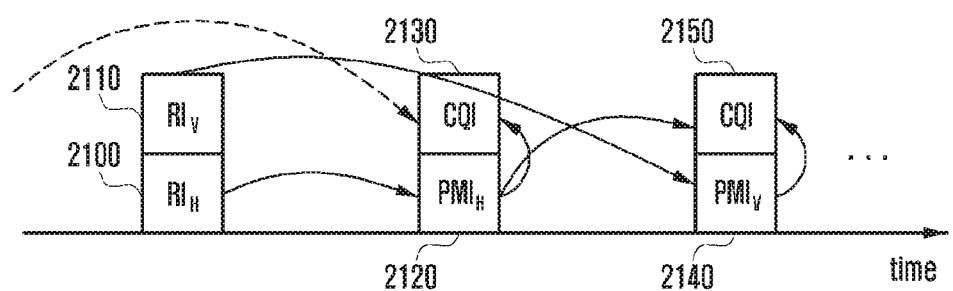
FIG. 21 is a diagram illustrating a sixth CSI reporting method of a UE according to an embodiment of the present invention.

FIG. 21 is a diagram illustrating a sixth CSI reporting method of a UE according to an embodiment of the present invention. In reference to FIG. 21, the UE may report the $RI_H$ 2100 and the $RI_V$ 2110 simultaneously. In this case, the $PMI_H$ 2120 and the $PMI_V$ 2140 may be generated based on the information contained in the $PMI_H$ 2120 and the $PMI_V$ 2140.

The UE may also determine the CQI 2130 for the case where the precoding matrix indicated by the $PMI_H$ 2120 and the precoding matrix indicated by the previously transmitted $PMI_H$ are applied simultaneously and report the determined CQI 2130 to the eNB. The UE may also determine the CQI 2150 for the case where the precoding matrix indicated by the $PMI_V$ 2140 and the precoding matrix indicated by the previously transmitted $PMI_H$ 2120 are applied simultaneously and report the determined CQI 2150 to the eNB.

At this time, the UE may assume the precoding matrix applied for generating the CQIs 2130 and 2150 as the Kronecker product of two precoding matrices as shown in Equation 3.

Figure 22:
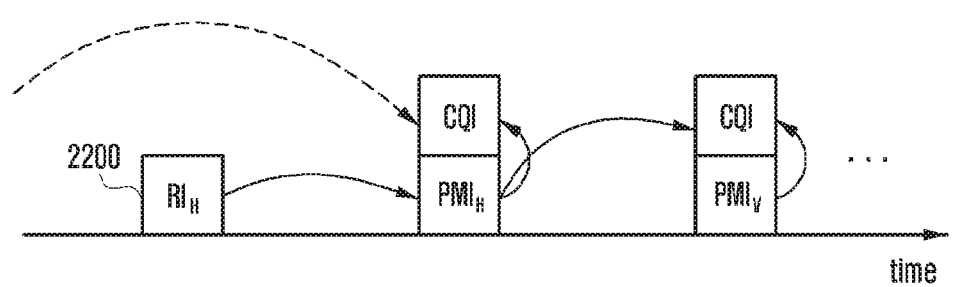
FIG. 22 is a diagram illustrating a seventh CSI reporting method of a UE according to an embodiment of the present invention.

FIG. 22 is a diagram illustrating a seventh CSI reporting method of a UE according to an embodiment of the present invention.

In FIG. 22, it is assumed that the vertical rank is fixed to 1. The vertical rank does not change because it is fixed to 1, and the UE may assume that the precoding matrix indicated by the previously transmitted $PMI_V$ is applied along with the precoding matrix indicated by the $PMI_H$.

Although the vertical rank is fixed to 1 in the drawing, it may be possible to fix the horizontal rank to 1 instead based on the same principle. In the case that the horizontal rank is fixed to 1, the UE may report to the eNB the $RI_V$ instead of the $RI_H$ during the corresponding transmission period.

Figure 23:
FIG. 23 is a block diagram illustrating a configuration of an eNB according to an embodiment of the present invention.

FIG. 23 is a block diagram illustrating a configuration of an eNB according to an embodiment of the present invention.

In reference to FIG. 23, the eNB may include a transceiver 2310, a controller 2320, and a memory 2330.

The transceiver 2310 may communicate signals with a network entity. The transceiver 2310 may transmit configuration information for generating the CSI and CSI reporting configuration information to a UE through higher layer signaling. The transceiver 2310 may transmit the configuration information by means of DCI. The transceiver 2310 may also receive CSI from the UE.

The controller 2320 may identify the number of transmit antennas and antenna arrangement state. The controller 2320 may also control the transceiver to transmit CSI-RS measurement configuration information for use by the UE in receiving the CSI-RS. At this time, each of the first and second CSIs may include one of horizontal and vertical CSIs.

In detail, the controller 2320 may control to transmit the information instructing the UE to calculate CQI to be contained in the second CSI by applying the PMI included in the first CSI along with the PMI included in the second CSI and to calculate the CQI to be included in the second CSI by applying the PMI included in the second CSI along with the PMI included in the first CSI.

The controller 2320 may also control to transmit the information instructing the UE to calculate the CQI for only one of the first and second CSIs.

The controller 2320 may also control to transmit CSI measurement interval and subframe offset configuration information for horizontal and vertical CSI measurement. The controller 2320 may also control to transmit to the UE the information on the maximum value of the horizontal or vertical rank or the information indicating that the one of the horizontal and vertical ranks is fixed to 1, depending on the case.

The controller 2320 may also control to transmit to the UE the configuration information instructing the UE to measure horizontal and vertical CSI-RSs and report the horizontal and vertical CSIs alternatively.

The controller 2320 may also control to transmit to the UE the configuration information instructing the UE to report the RI included in the vertical CSI and the RI included in the vertical CSI at a time.

The controller 2320 may also transmit the configuration information instructing the UE to report the CSI containing the first and second CSIs. The controller 2320 may transmit the CSI reporting configuration information to the UE through higher layer signaling. The controller 2320 may also transmit the CSI-RS configuration information instructing the UE to report the CSI using DCI. The controller 2320 may also trigger aperiodic CSI reporting with the DCI.

The CSI reporting configuration information may include the CSI reporting interval and subframe offset.

The controller 2320 may also receive the CSI transmitted by the UE.

The detailed description of the configuration information that the controller 2320 configures to the UE has been made above and thus omitted herein. The controller 2320 may also control the above-described operations of the eNB.

The memory 2330 may store the CSI-RS measurement and CSI reporting configuration information. The memory 2330 may also store the CSI received from the UE. Furthermore, the memory 2330 may store the information generated by the eNB and received from the UE.

Figure 24:
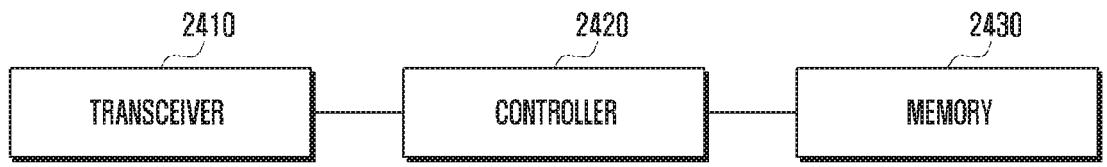
FIG. 24 is a block diagram illustrating a configuration of a UE according to an embodiment of the present invention.

FIG. 24 is a block diagram illustrating a configuration of a UE according to an embodiment of the present invention.

In reference to FIG. 24, the UE may include a transceiver 2410, a controller 2420, and a memory 2430.

The transceiver 2410 may communicate signals with a network entity. The transceiver 2410 may receive the CSI-RS measurement configuration information and CSI reporting configuration information through higher layer signaling. The transceiver 2410 may also receive the configuration information by means of DCI. The transceiver 2410 may also transmit the CSI.

The controller 2420 may receive the CSI-RS measurement configuration information from the eNB. As described above, the CSI may include the first and second CSIs, and the controller 2420 may receive first and second CSIs reporting configuration information.

The detailed description of the CSI reporting configuration information has been made above and thus omitted herein.

The controller 2420 may perform CSI-RS measurement according to the received measurement configuration information.

The controller 2420 may also receive CSI reporting configuration information from the eNB. At this time, the controller 2420 may receive the DCI triggering aperiodic CSI reporting.

The controller 2420 may also report CSI to the eNB according to the reporting configuration. If the aperiodic reporting is triggered, the controller 2420 may report the CSI at a reporting time point.

The memory 2430 may store the measurement configuration information and reporting configuration information received from the eNB. The memory 2430 may also store the generated CSI. Furthermore, the memory 2430 may store the information generated by the UE or received from the eNB.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method performed by a base station in a wireless communication system, the method comprising:
    transmitting, to a terminal, configuration information for configuring at least one aperiodic channel state information reference signal (CSI-RS) resource set via radio resource control (RRC) signaling;
    transmitting, to the terminal, downlink control information (DCI) including information associated with triggering of the at least one aperiodic CSI-RS resource set configured according to the configuration information, the information indicating no triggering of the at least one aperiodic CSI-RS resource set or one of at least one identifier of the at least one aperiodic CSI-RS resource set; and
    mapping data to physical downlink shared channel (PDSCH) resources determined based on an aperiodic CSI-RS resource set triggered by the information in case that the information indicates one of the at least one identifier of the at least one aperiodic CSI-RS resource set,
    wherein no triggering of the at least one aperiodic CSI-RS resource set is indicated by the information which does not indicate one of the at least one identifier of the at least one aperiodic CSI-RS resource set.

2. The method of claim 1, wherein the DCI is transmitted on a physical downlink control channel (PDCCH).

3. The method of claim 1,
    wherein the PDSCH resources are determined by excluding resources of the triggered aperiodic CSI-RS resource set; and
    wherein a number of bits of the information is determined based on a number of the at least one aperiodic CSI-RS resource set.

4. A method of a terminal, the method comprising:
    receiving, from a base station, configuration information for configuring at least one aperiodic channel state information reference signal (CSI-RS) resource set via radio resource control (RRC) signaling;
    receiving, from the base station, downlink control information (DCI) including information associated with triggering of the at least one aperiodic CSI-RS resource set configured according to the configuration information, the information indicating no triggering of the at least one aperiodic CSI-RS resource set or one of at least one identifier of the at least one aperiodic CSI-RS resource set; and
    decoding a physical downlink shared channel (PDSCH) based on an aperiodic CSI-RS resource set triggered by the information in case that the information associated with triggering of the aperiodic CSI-RS resource set indicates one of the at least one identifier of the at least one aperiodic CSI-RS resource set,
    wherein no triggering of the at least one aperiodic CSI-RS resource set is indicated by the information which does not indicate one of the at least one identifier of the at least one aperiodic CSI-RS resource set.

5. The method of claim 4, wherein the DCI is transmitted on a physical downlink control channel (PDCCH).

6. The method of claim 4, wherein a number of bits of the information is determined based on a number of the at least one aperiodic CSI-RS resource set.

7. The method of claim 6, wherein decoding the PDSCH comprises:
    decoding data on PDSCH resources determined by excluding resources of the triggered aperiodic CSI-RS resource set.

8. A base station comprising:
    a transceiver; and
    a controller coupled with the transceiver and configured to:
        transmit, via the transceiver to a terminal, configuration information for configuring at least one aperiodic channel state information reference signal (CSI-RS) resource set via radio resource control (RRC) signaling,
        transmit, via the transceiver to the terminal, downlink control information (DCI) including information associated with triggering of the at least one aperiodic CSI-RS resource set configured according to the configuration information, the information indicating no triggering of the at least one aperiodic CSI-RS resource set or one of the at least one identifier of the at least one aperiodic CSI-RS resource set, and
        map data to physical downlink shared channel (PDSCH) resources determined based on an aperiodic CSI-RS resource set triggered by the information in case that the information indicates one of the at least one identifier of the at least one aperiodic CSI-RS resource set,
    wherein no triggering of the at least one aperiodic CSI-RS resource set is indicated by the information which does not indicate one of the at least one identifier of the at least one aperiodic CSI-RS resource set.

9. The base station of claim 8, wherein the DCI is transmitted on a physical downlink control channel (PDCCH).

10. The base station of claim 8, wherein a number of bits of the information is determined based on a number of the at least one aperiodic CSI-RS resource set.

11. The base station of claim 8, wherein the PDSCH resources are determined by excluding resources of the triggered aperiodic CSI-RS resource set.

12. A terminal comprising:
    a transceiver; and
    a controller coupled with the transceiver and configured to:
        receive, via the transceiver from a base station, configuration information for configuring at least one aperiodic channel state information first reference signal (CSI-RS) resource set via radio resource control (RRC) signaling, receive, via the transceiver from the base station, downlink control information (DCI) including information associated with triggering of the at least one aperiodic CSI-RS resource set configured according to the configuration information, the information indicating no triggering of the at least one aperiodic CSI-RS resource set or one of at least one identifier of the at least one aperiodic CSI-RS resource set, and decode a physical downlink shared channel (PDSCH) based on an aperiodic CSI-RS resource set triggered by the information in case that the information associated with triggering of the aperiodic CSI-RS resource set indicates one of the at least one identifier of the at least one aperiodic CSI-RS resource set, wherein no triggering of the at least one aperiodic CSI-RS resource set is indicated by the information which does not indicate one of the at least one identifier of the at least one aperiodic CSI-RS resource set.

13. The terminal of claim 12, wherein the DCI is transmitted on a physical downlink control channel (PDCCH).

14. The terminal of claim 12, wherein a number of bits of the information is determined based on a number of the at least one aperiodic CSI-RS resource set.

15. The terminal of claim 14, wherein the controller is configured to decode data on PDSCH resources determined by excluding resources of the triggered aperiodic CSI-RS resource set.

* * * * *